Figure 8:
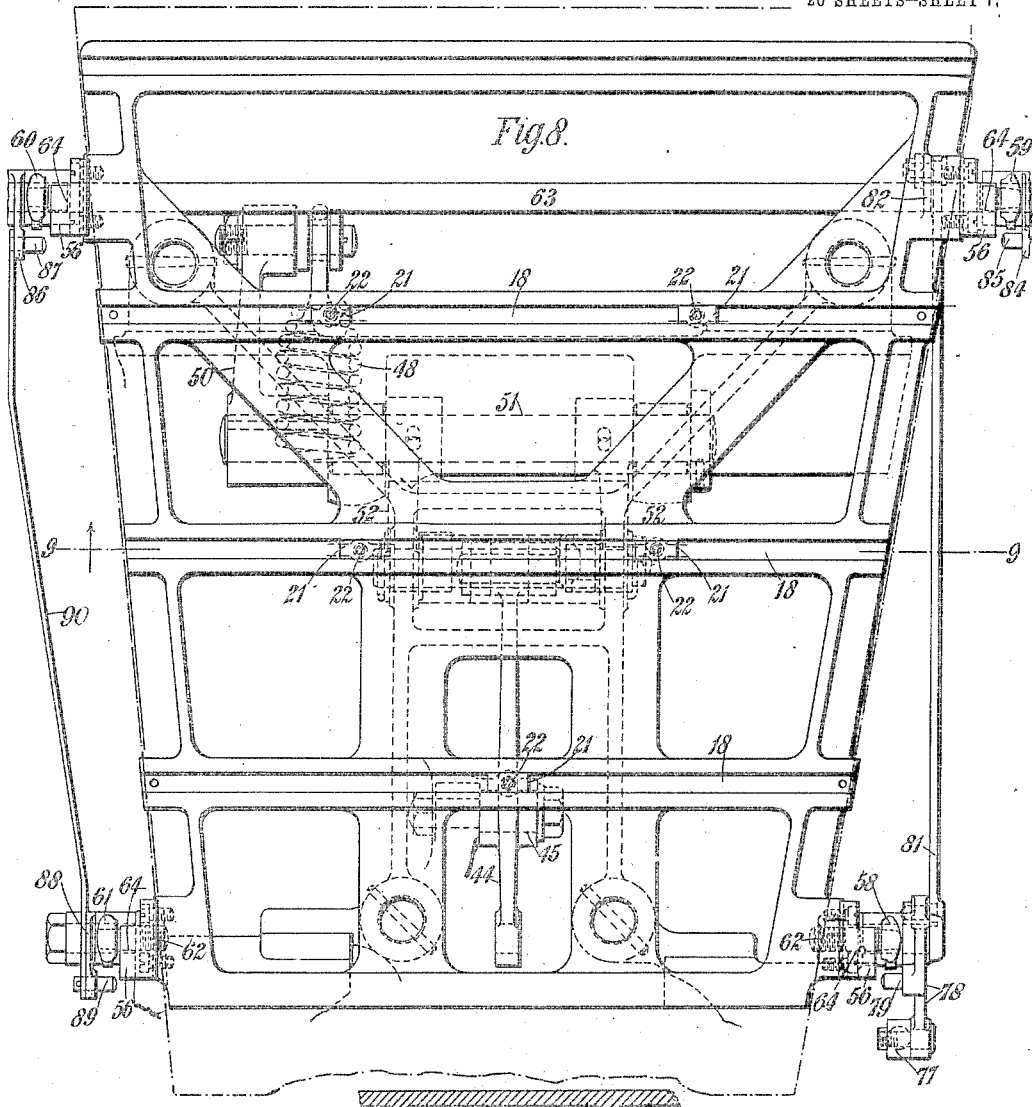

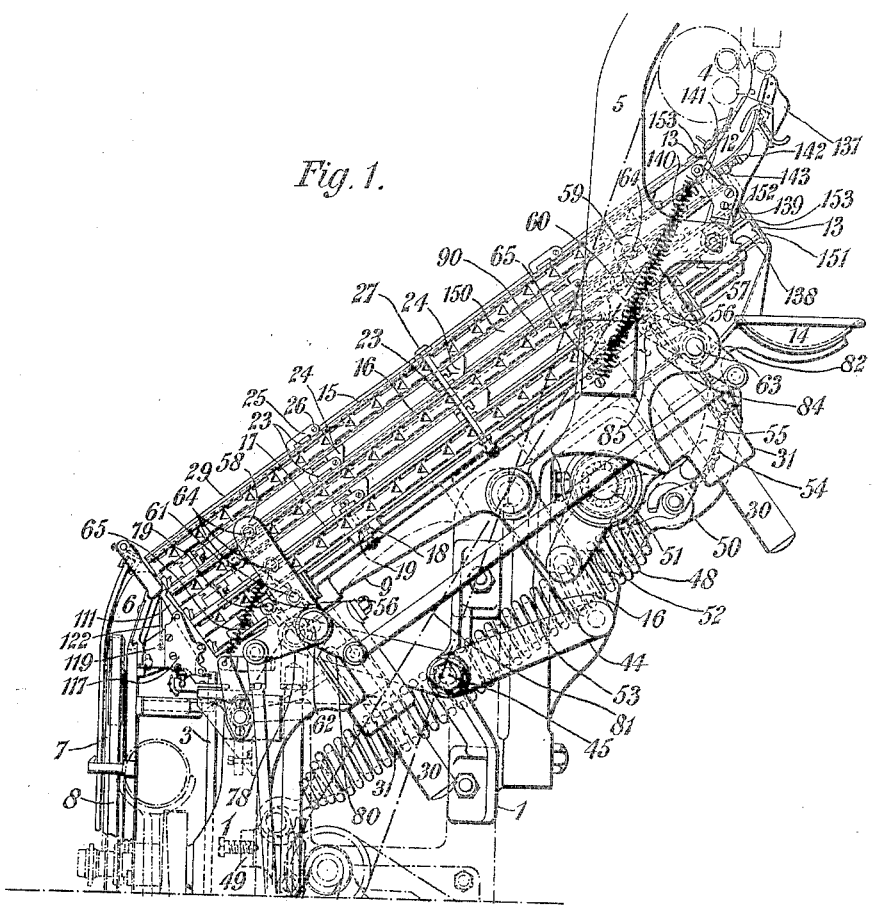

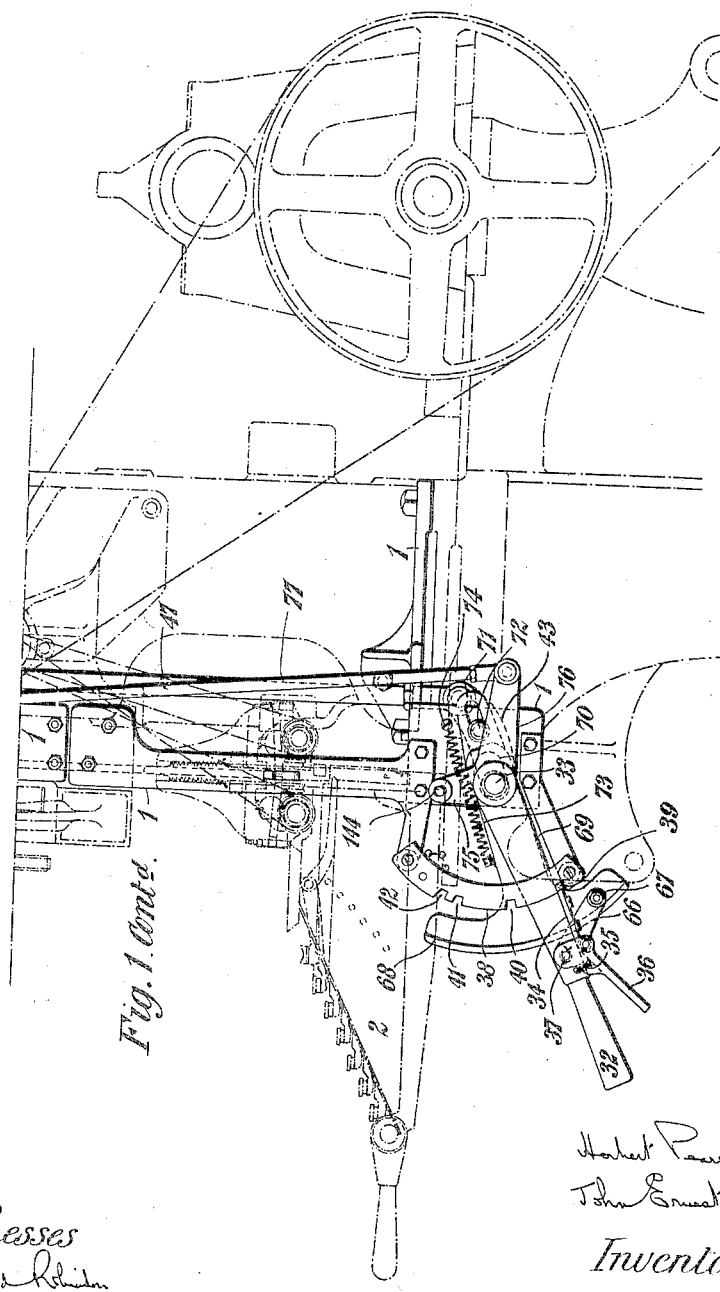

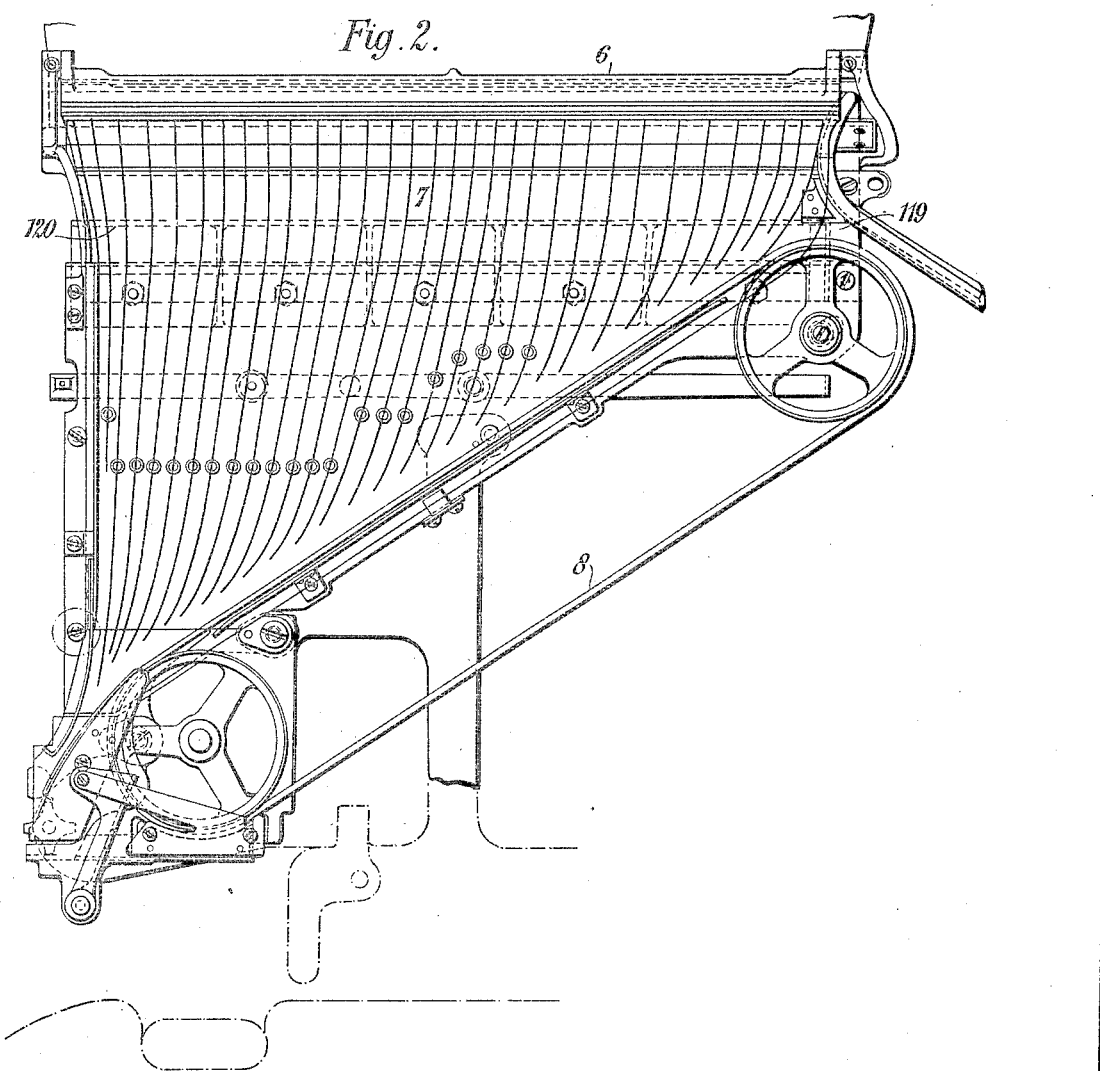

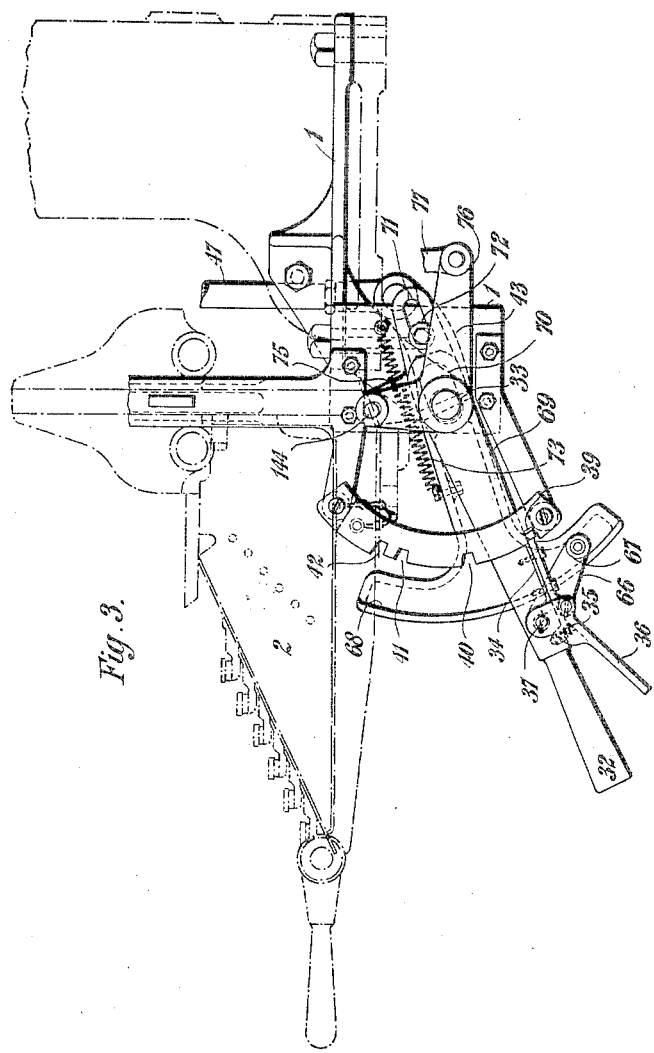

H. PEARCE & J. E. BILLINGTON.
TYPOGRAPHICAL COMPOSING MACHINE.
APPLICATION FILED JULY 27, 1908. RENEWED JULY 31, 1914.
1,116,624.
Patented Nov. 10, 1914.
20 SHEETS—SHEET 5.
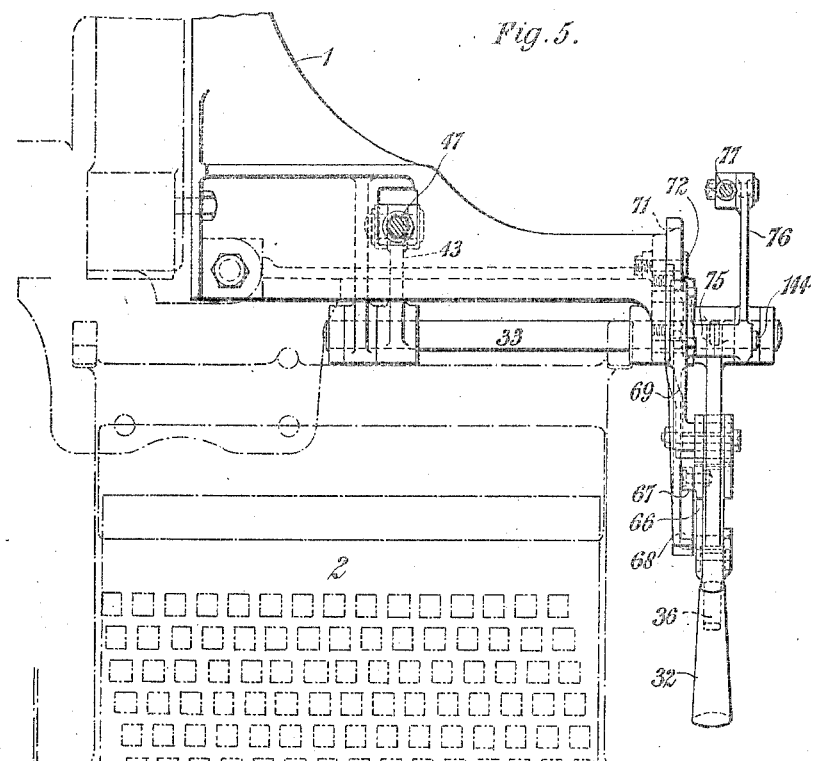
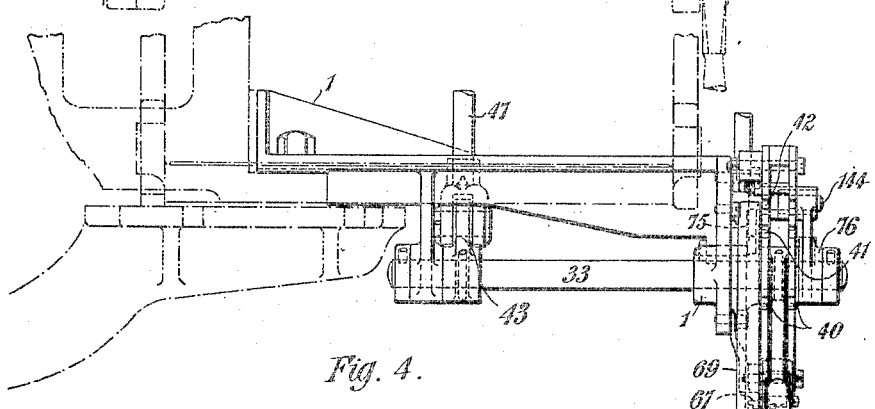

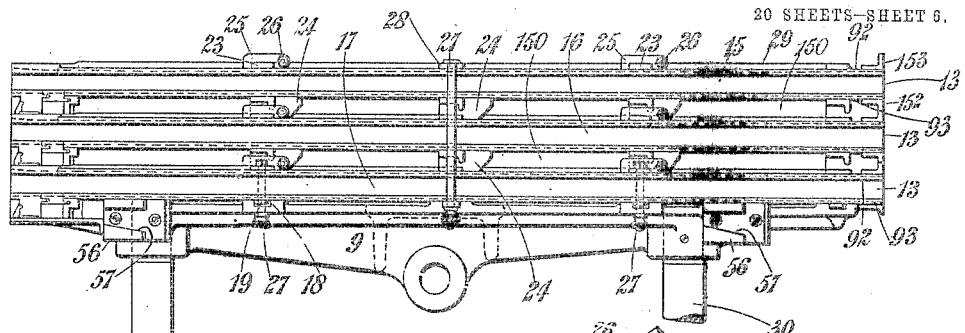
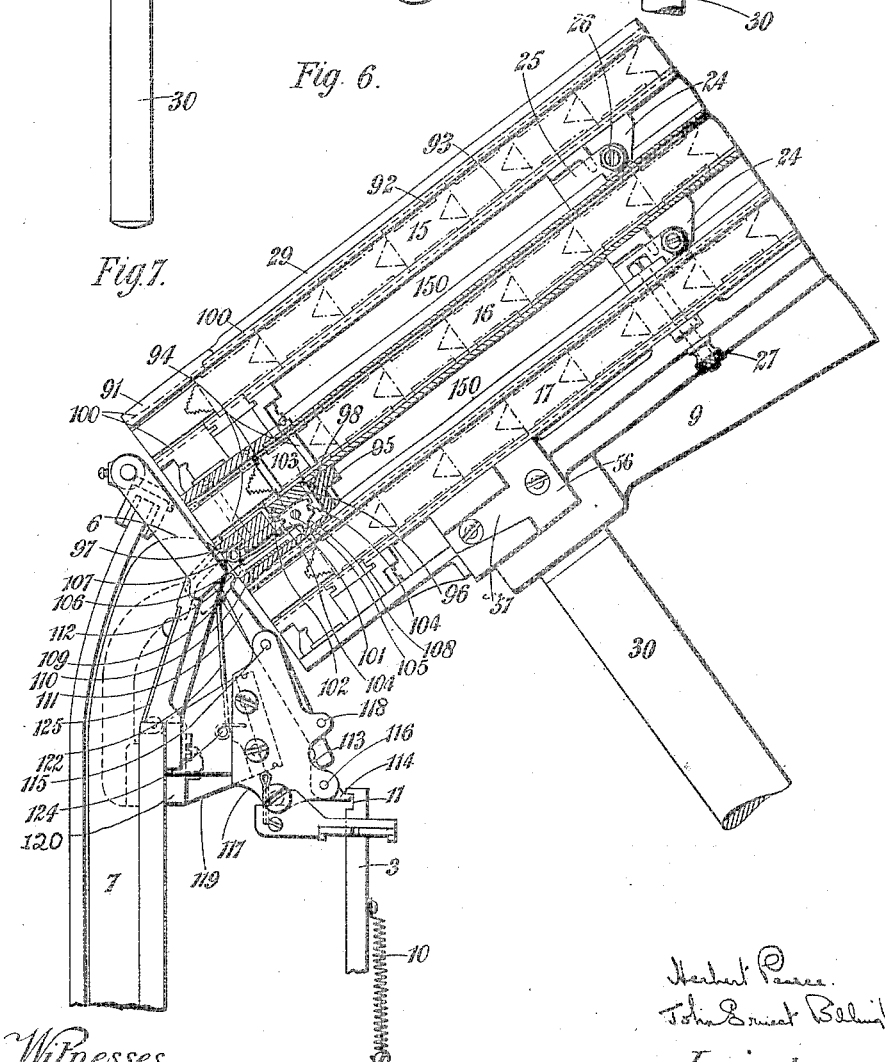

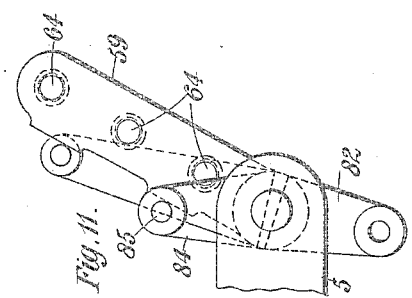
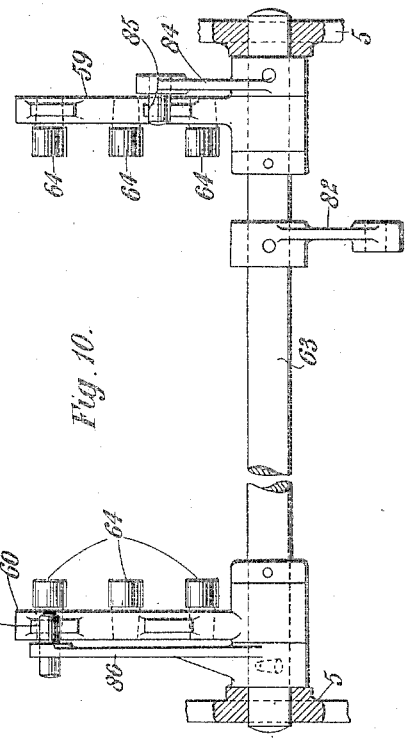

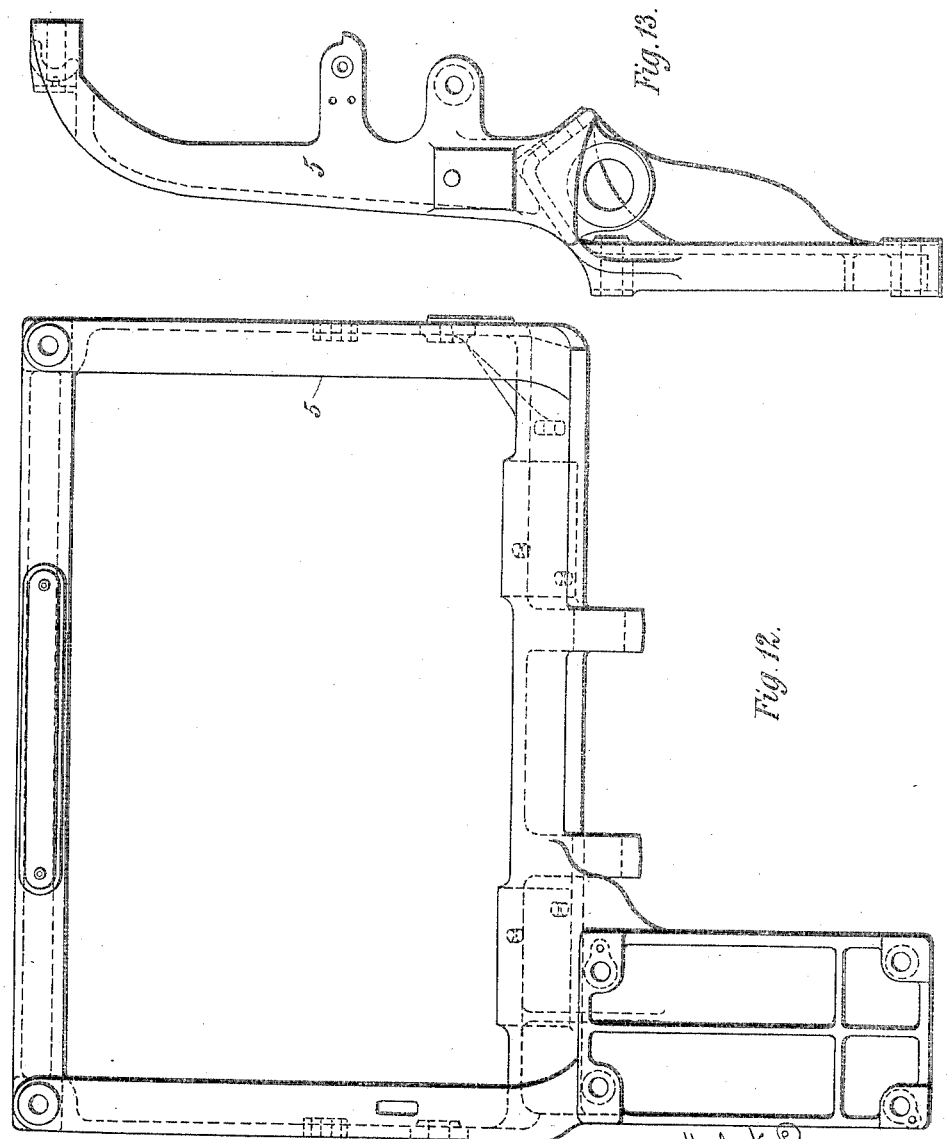

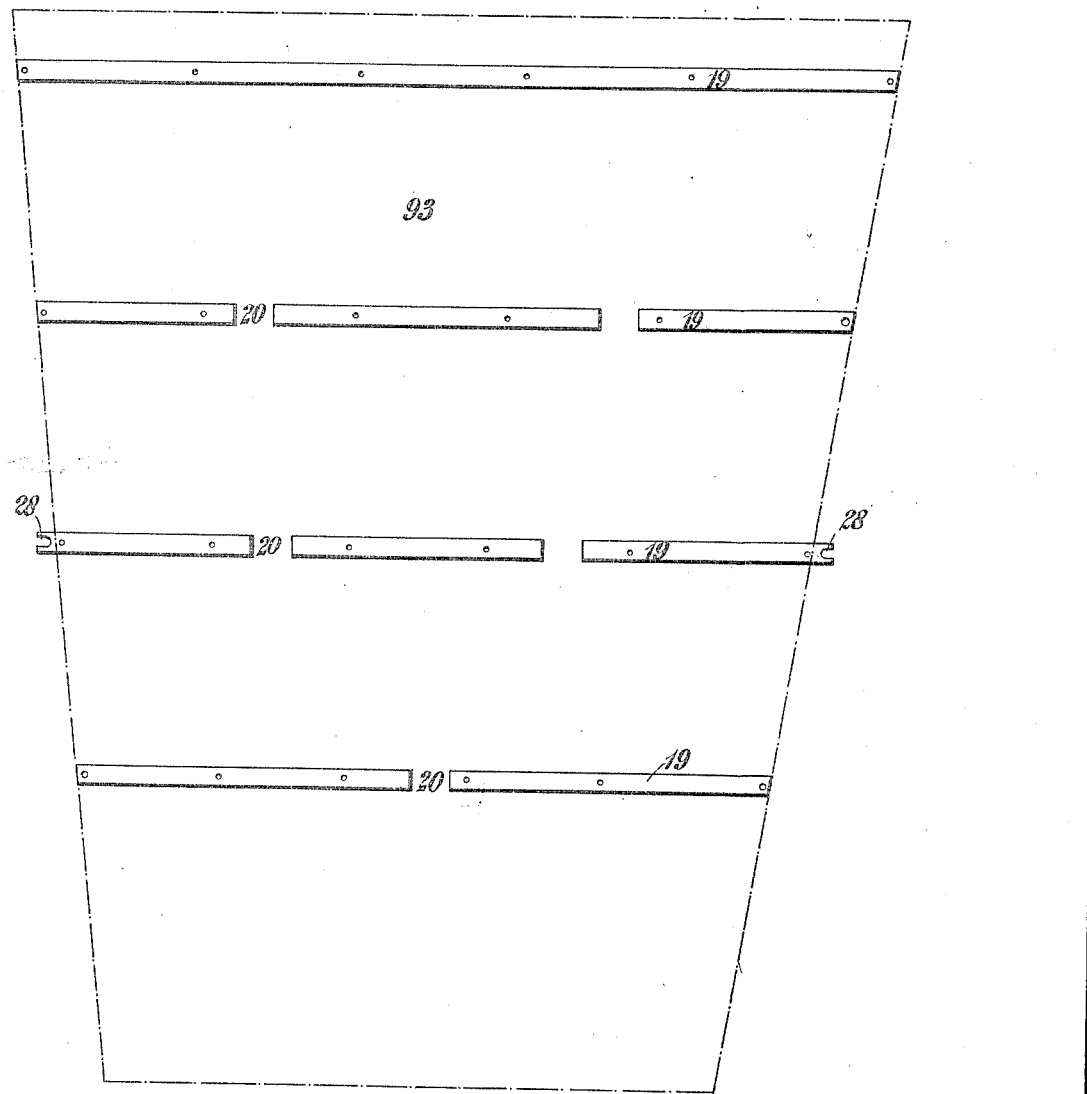

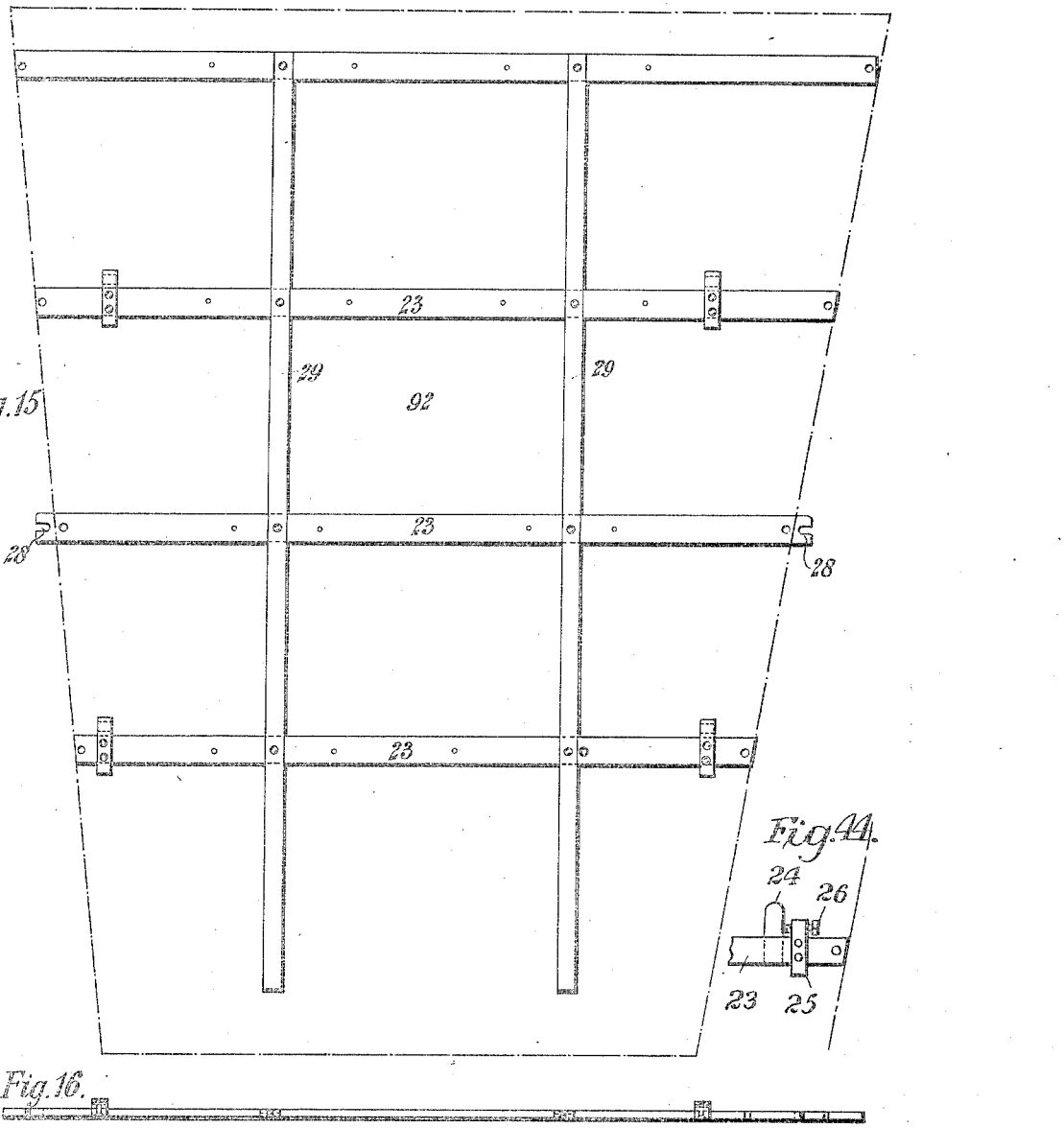

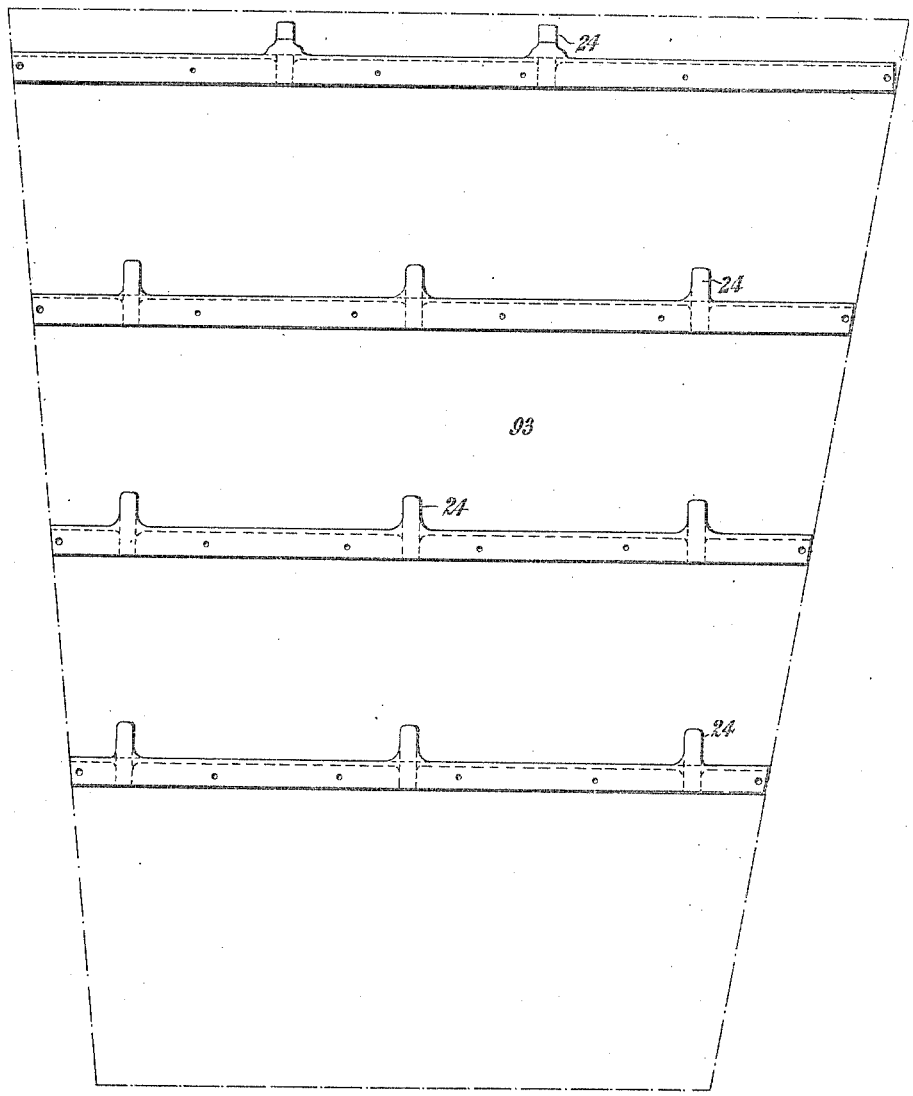
Fig. 18.
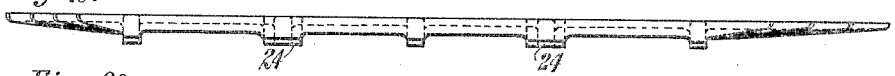
Fig. 19.
Fig. 20.

H. PEARCE & J. E. BILLINGTON.
TYPOGRAPHICAL COMPOSING MACHINE.
APPLICATION FILED JULY 27, 1908. RENEWED JULY 31, 1914.

1,116,624.

Patented Nov. 10, 1914.
20 SHEETS—SHEET 13.

Witnesses
Inventors
Herbert Pearce.
John Ernest Billington.
per Woodroffe
Attorney H. PEARCE & J. E. BILLINGTON.
TYPOGRAPHICAL COMPOSING MACHINE.
APPLICATION FILED JULY 27, 1908. RENEWED JULY 31, 1914.
1,116,624.
Patented Nov. 10, 1914.
20 SHEETS—SHEET 14.
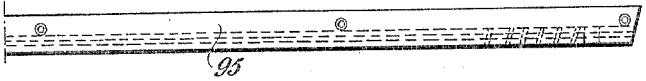
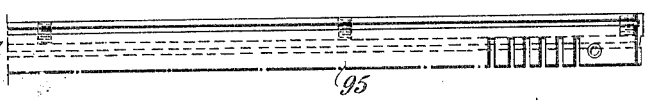
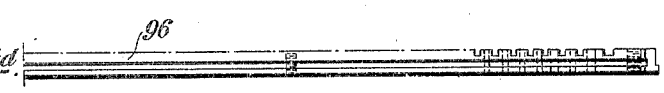
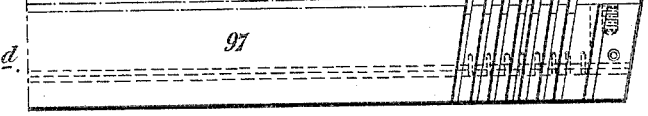
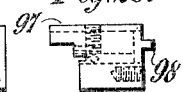
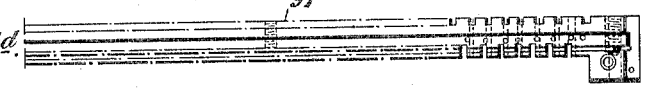
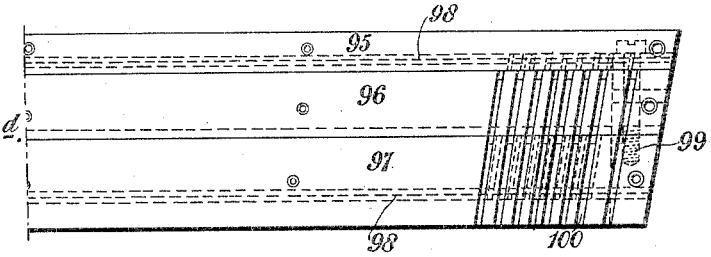
Witnesses
Inventors
Attorney H. PEARCE & J. E. BILLINGTON.
TYPOGRAPHICAL COMPOSING MACHINE.
APPLICATION FILED JULY 27, 1908. RENEWED JULY 31, 1914.

1,116,624.

Patented Nov. 10, 1914.
20 SHEETS—SHEET 15.

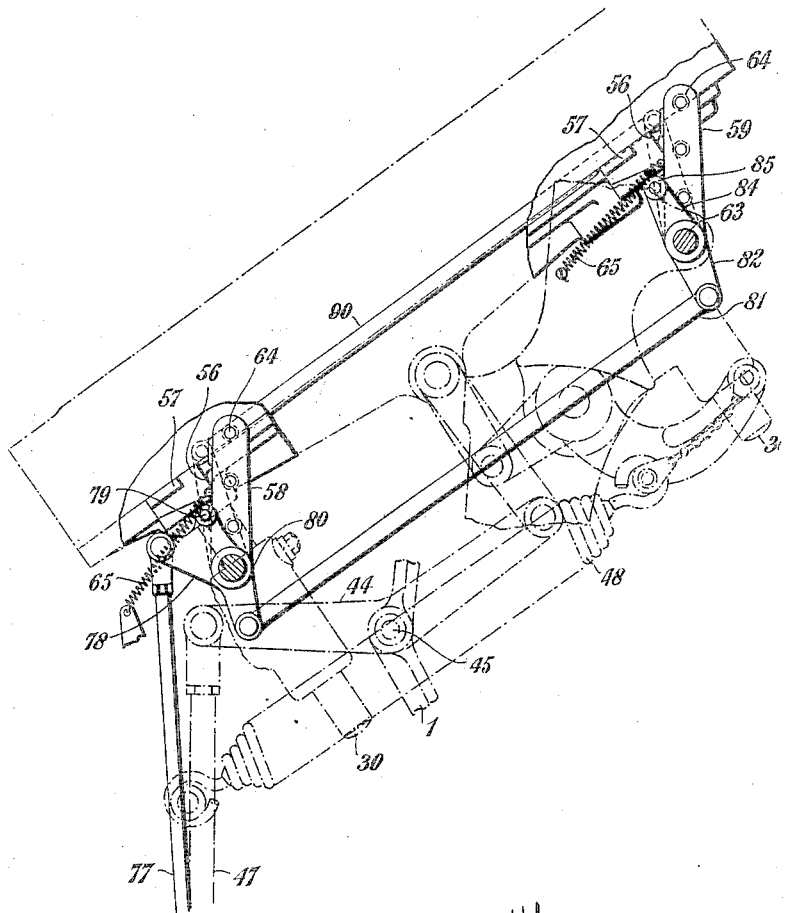
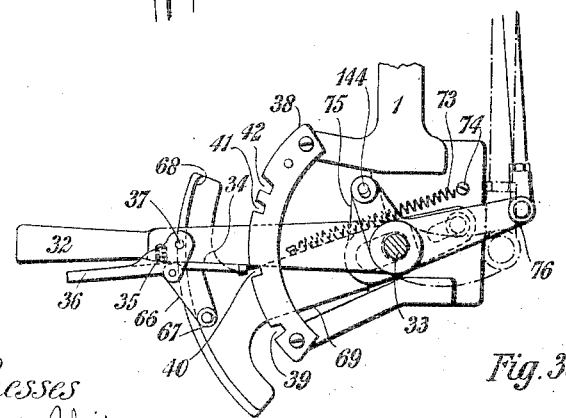
Fig. 35.

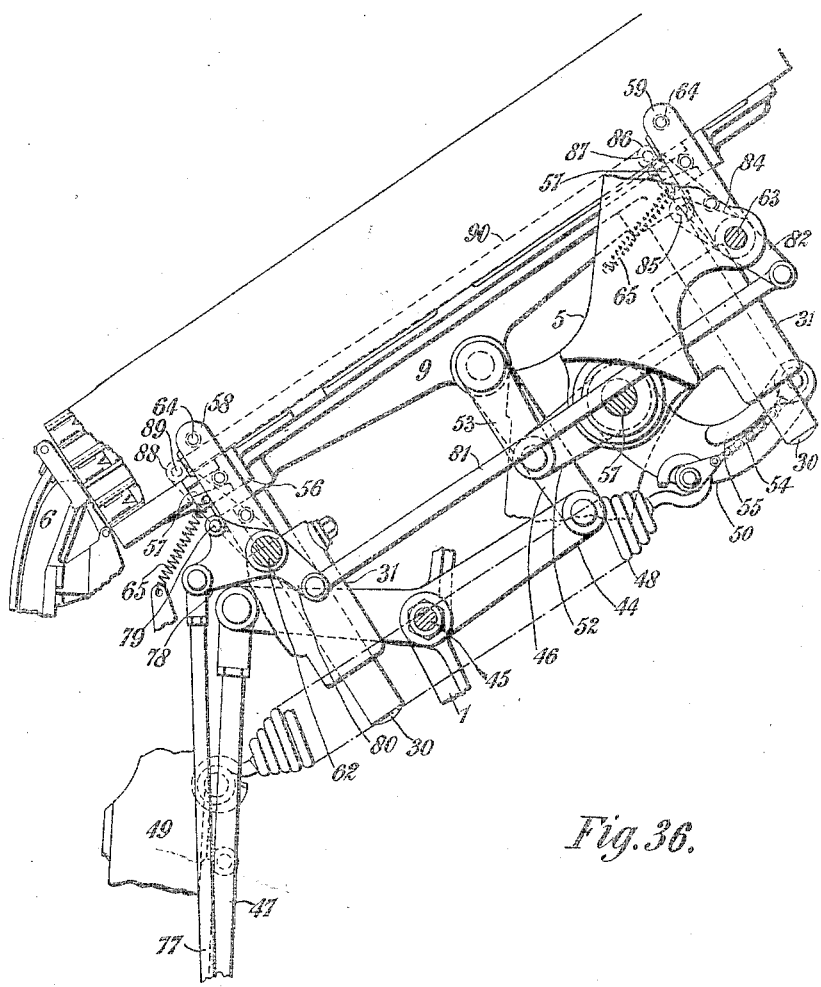
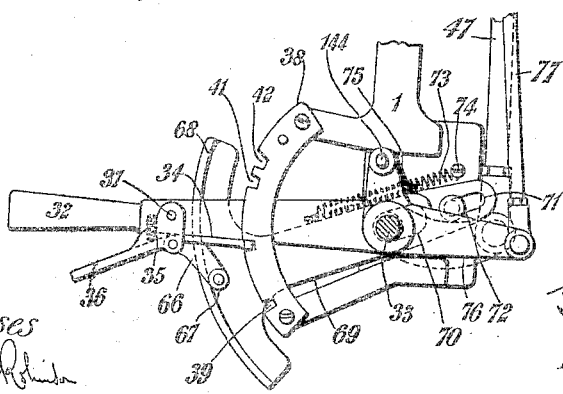
Fig. 36.

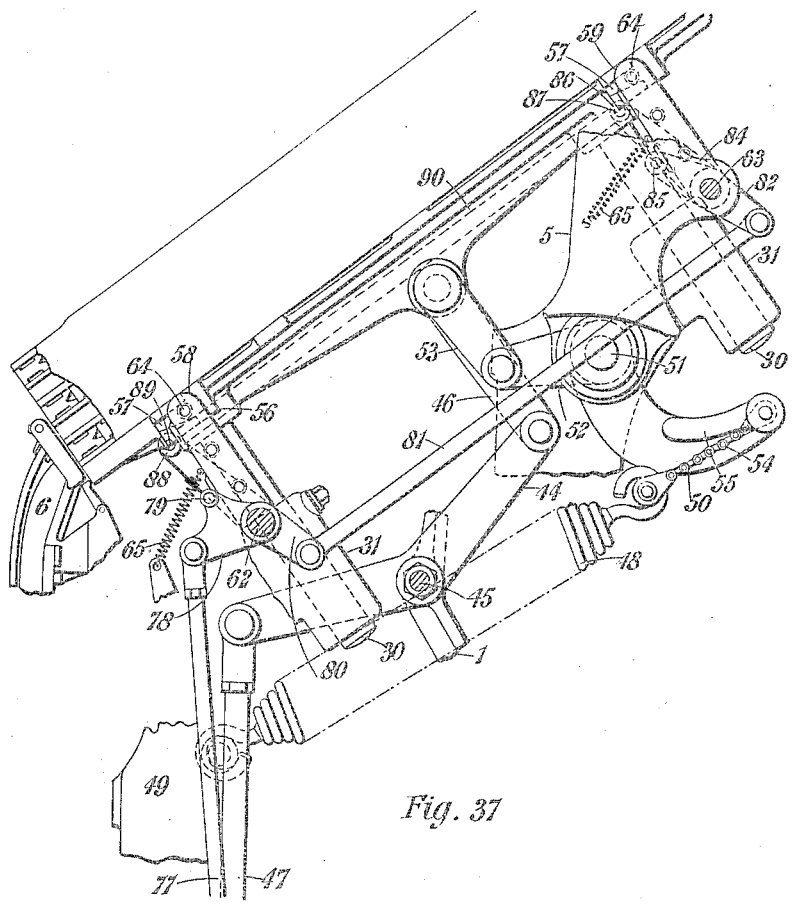
Fig. 37
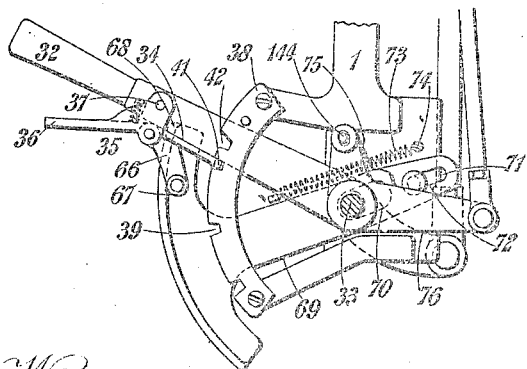

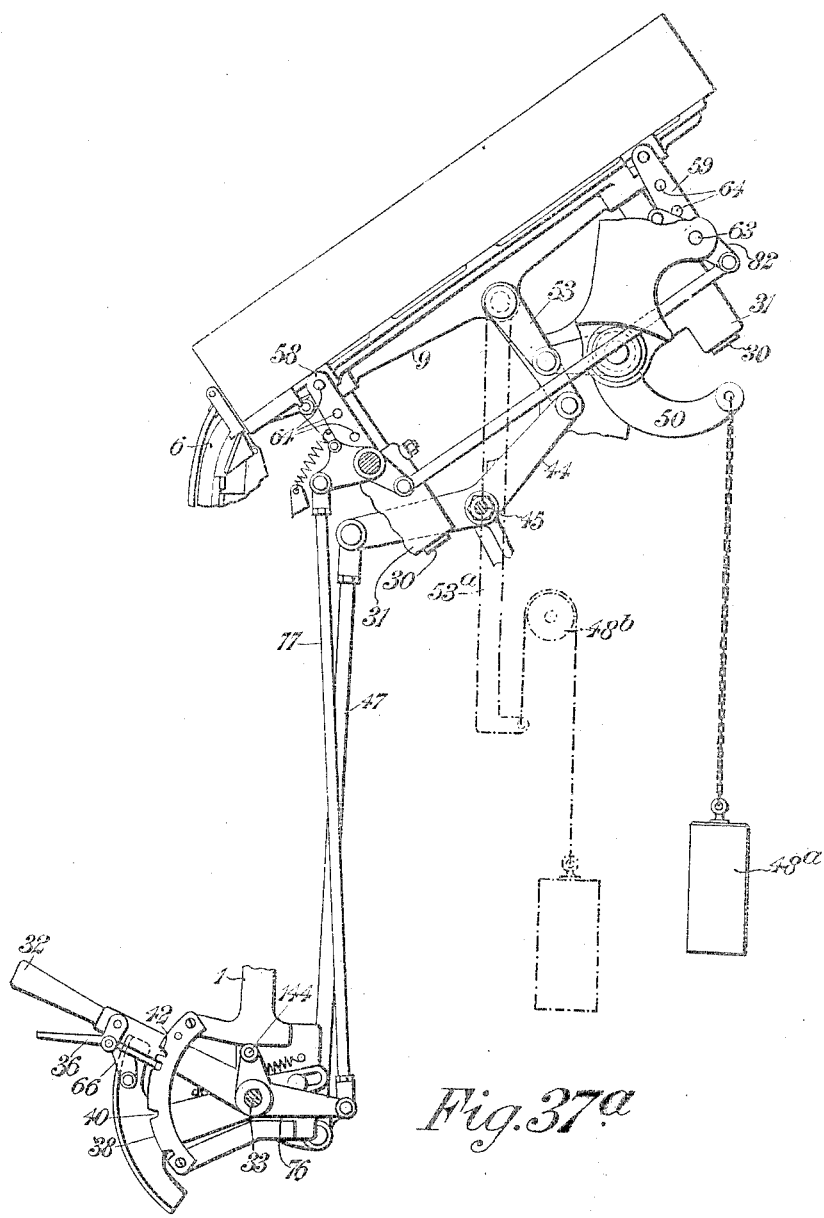

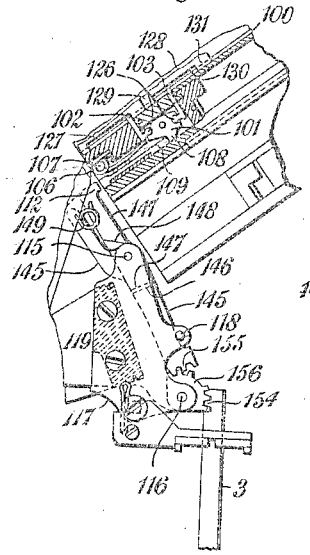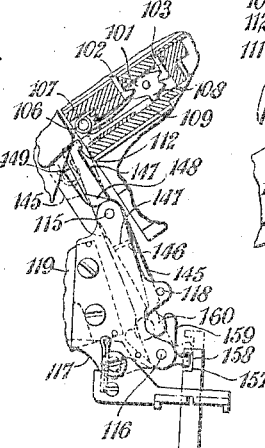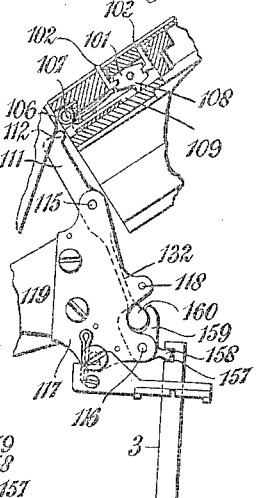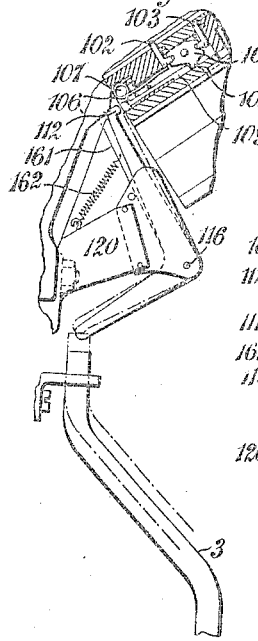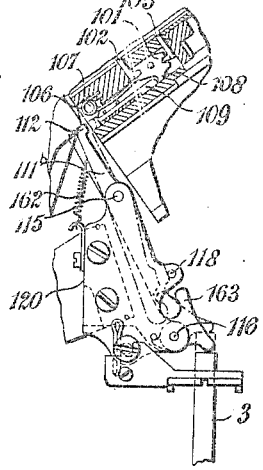

UNITED STATES PATENT OFFICE.

HERBERT PEARCE AND JOHN ERNEST BILLINGTON, OF BROADHEATH, ENGLAND, ASSIGNORS, BY MESNE ASSIGNMENTS, TO MERGENTHALER LINOTYPE COMPANY, A CORPORATION OF NEW YORK.

TYPOGRAPHICAL COMPOSING-MACHINE.

1,116,624.     Specification of Letters Patent.     Patented Nov. 10, 1914.

Application filed July 27, 1908, Serial No. 445,631. Renewed July 21, 1914. Serial No. 854,400.

*To all whom it may concern:*

Be it known that we, HERBERT PEARCE and JOHN ERNEST BILLINGTON, subjects of the King of the United Kingdom of Great Britain and Ireland, and residing at the Linotype and Machinery Works, Broadheath, in the county of Chester, England, have invented new and useful Improvements in Typographical Composing-Machines, of which the following is a specification.

This invention relates to typographical composing machines composing matrices or type dies, irrespectively of whether the ultimate result of their operation be linotypes, lines of type or only stereotypers' matrices, and which machines are of a type characterized by a column of magazines each carrying its own escapements, the said column interposed between a single keyboard, a single set of connections therefrom to the escapements on the magazines and a single assembler entrance, on the one hand, and a single magazine entrance and a single distributer on the other, and means for moving the column up and down to effect a "quick change", *i. e.*, to quickly make the one containing the desired font (or substituted magazine) register with the assembler entrance and the magazine entrance. It is characterized by certain improvements in the column of magazines; in the "quick change" mechanism, in means for balancing the weight of the column during a "quick change"; in means for insuring exactness of register on the part of a substituted magazine after each "quick change"; and in the coöperation of the magazine entrance with the column of magazines.

One object of the invention is to effect improvements in the Mergenthaler linotype machines described in the specifications of Letters Patent 635998, and 787817 in respect of the escapements of the former and in the connections between the keyboard and the escapements of the latter. The application of the invention to a Mergenthaler linotype machine has been chosen for specification as the best means of making the nature of it clearly understood.

Figure 9:
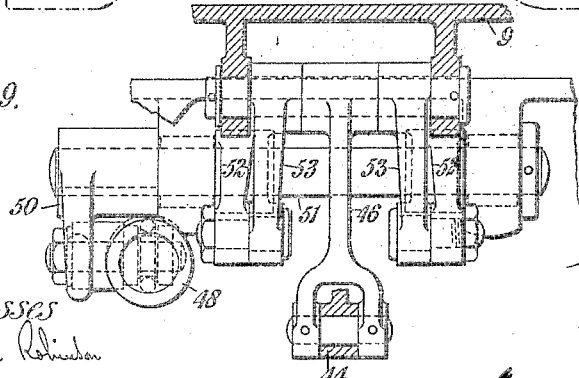
Figure 21:
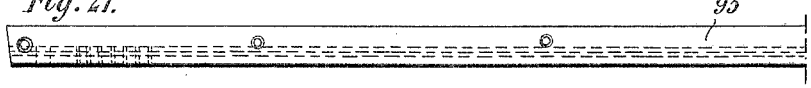
Figure 22:
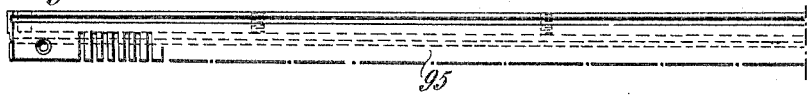
Figure 24:
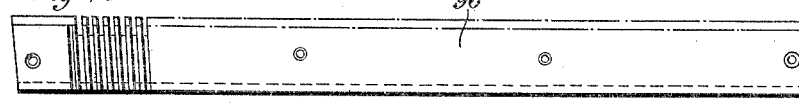
Figure 25:
Figure 27:
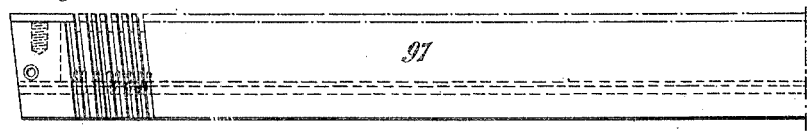

Referring to the accompanying drawings which are to be taken as part of this specification and read therewith, Figure 1 is divided into two halves which together form a side elevation from the right of a machine made according to the present invention, and showing the top magazine in insured register with the distributer and the assembler entrance: Fig. 2, a front elevation of the assembler guide and adjacent parts: Fig. 3, a detail side elevation from the right, of the keyboard portion of the means for "quick changing" and insuring exactness of register on the part of the magazines: Fig. 4, a front elevation corresponding with Fig. 3: Fig. 5, a plan corresponding with Figs. 3 and 4: Fig. 6, a detail side elevation from the right, showing how the several magazines of a column are held together: Fig. 7, an enlarged detail sectional elevation from the right of the matrix escapement mechanism shown in connection with the middle magazine, that being the one in register with the assembler entrance and the magazine entrance: Fig. 8, a plan of a magazine frame: Fig. 9, a section on the line 9—9 of Fig. 8: Fig. 10, a detail front elevation of the rear pair of magazine locating means: Fig. 11, a side elevation of Fig. 10 from the right: Fig. 12, a front elevation of the part of the machine frame known as the distributer bracket: Fig. 13, a side elevation of Fig. 12, from the right: Fig. 14, an inverted plan of the bottom magazine of the column: Fig. 15, a plan of the top of any magazine of the column: Fig. 16, a front elevation of Fig. 15: Fig. 17, a side elevation of Fig. 15, from the right: Fig. 18, an inverted plan of any upper magazine of the column: Fig. 19, a front elevation of Fig. 18: Fig. 20, a side elevation of Fig. 18, from the right: Fig. 21 is divided into two halves which together form a plan; Fig. 22 is divided into two halves which together form a front elevation; and Fig. 23 is a side elevation from the right, of the rear member of an escapement bar: Fig. 24 is divided into two halves which together form a plan; Fig. 25 is divided into two halves which together form a front elevation; and Fig. 26 is a side elevation from the right, of the top middle member of an escapement bar: Fig.

Figure 28:
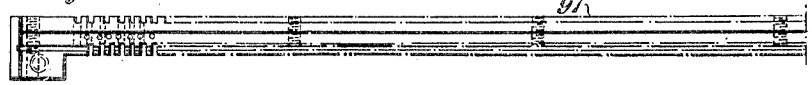
Figure 30:
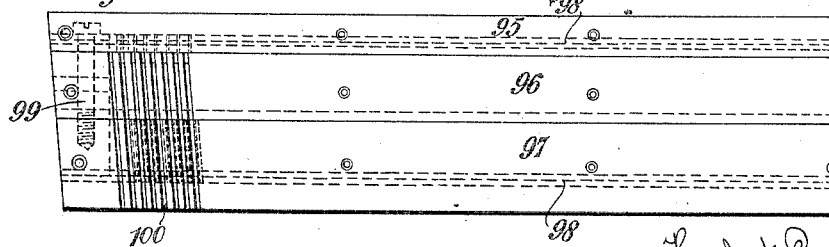
Figure 31:
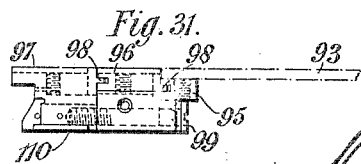
Figure 32:
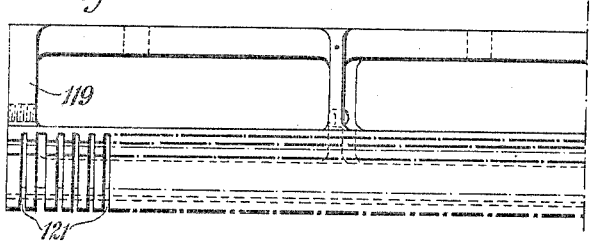
Figure 34:
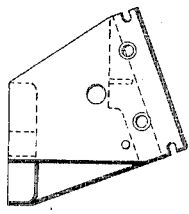
Figure 33:
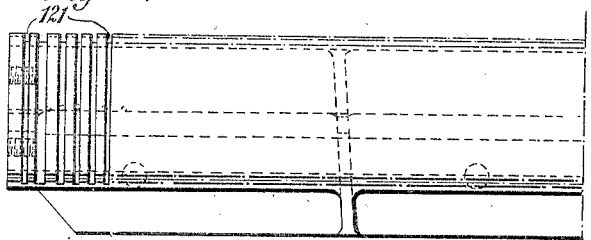
Figure 32:
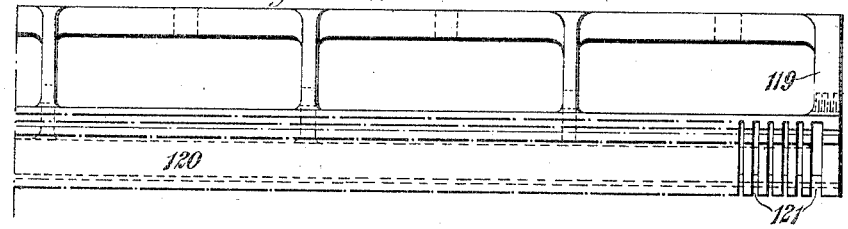
Figure 33:
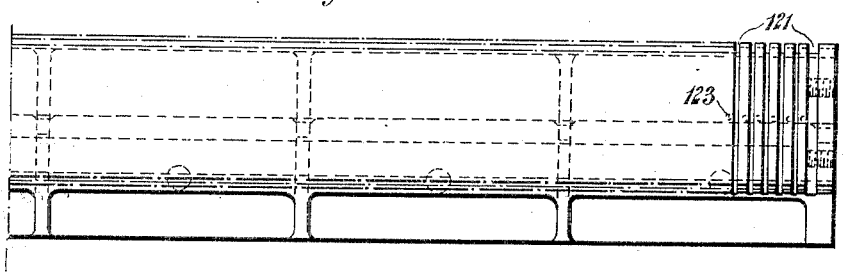

27 is divided into two halves which together form a plan; Fig. 28 is divided into two halves which together form a front elevation; and Fig. 29 is a side elevation from the right, of the front member of an escapement bar; Fig. 30 is divided into two halves which together form a plan of an escapement bar: Fig. 31, a side elevation of Fig. 30, from the right: Fig. 32 is divided into two halves which together form a plan; Fig. 33 is divided into two halves which together form a rear elevation; and Fig. 34, a side elevation from the right, of the transverse bar that carries the escapement striker levers: Fig. 35, a side elevation showing the register insuring means out of engagement with the locating blocks: Fig. 36, a side elevation showing the register-insuring means coöperating with the middle magazine: Fig. 37, a replica of Fig. 36 but in respect of the bottom magazine of the column; and Fig. 37ª is a view substantially similar to Fig. 37 but showing a counterweight in place of the spring 48. Figs. 38 to 43 inclusive, detail sectional elevations of modifications of the escapement mechanism shown in Fig. 7. Fig. 44 is an inverted plan view showing an adjusting screw operative between devices seen in Figs. 15 and 18 respectively.

1, 1 are parts of the frame of the machine; 2, the single keyboard; 3, one of the single sets of escapement rods, the several rods of which are raised by the respective keys of the keyboard; 4, the single distributer; 5, a part of the machine frame known as the distributer bracket; 6, the single assembler entrance; 7, the assembler guide; 8, the assembler belt; 9, the magazine frame; 10, one of the set of springs that pull the escapement rods 3 down after they have been raised; 11, the notch in the top end of an escapement lever; 12, the magazine entrance; 13, the entrance mouth of a magazine, and 14, the matrix trough.

*Column of magazines*, (Figs. 1, 6 and 7, 14 to 20.)—The column of magazines illustrated comprises three, 15, 16, 17, but this number is variable according to the requirements of each user of the invention. The bottom magazine 17 of the column rests—Figs. 1 and 7—upon the magazine frame 9. This has hitherto been a substantially flat frame having the bottom magazine of its column held to it by suitable means. Inasmuch as the several matrix grooves 100 in the magazine must register exactly with the respective divisions of the assembler entrance 6, and the magazine is positioned obliquely on the machine, it follows that devices are necessary to position it correctly in a forward as well as in a lateral sense. According to the present invention, there are—Fig. 8—a series of parallel, transverse grooves 18 in the top face of the frame 9. These grooves are of uniform sectional area; are, preferably, equidistant; and, in addition to being parallel with each other, are parallel with the front of the machine. The bottom face—Fig. 14—of the said magazine 17 has a similar series of bars 19 to engage slidingly in the respective grooves 18. There are one or more intervals 20 in each bar 19, but none of the intervals in any of the said bars, are exactly opposite, in a front and rear sense, to those in any other bar of the series. All the intervals 20 are of uniform size. The magazine frame 9 has in its grooves 18, blocks 21 of the same size as the intervals 20, the said blocks 21 corresponding in number and approximately in position, with the said intervals, respectively. Each block 21 carries a screw device 22 that allows it to be moved laterally by the magazine 17 as the latter is being moved to the right or left to put it into register as next explained, and by which it can be fixed in its groove 18 when that position has been ascertained. All such positions are ascertained by laying the magazine 17 down on the frame 9 with its intervals 20 straddling the respective blocks 21, moving it laterally until its matrix grooves 100 register exactly with the respective divisions of the above-mentioned assembler entrance 6, and then fixing the said blocks 21 in the respective positions into which the lateral adjustment of the magazine 17, has moved them, by tightening up by hand the screw devices 22. The positions of the blocks 21 are now permanent and correspond with the working position of the magazine 17, so that each substituted bottom magazine is obliged, by the engagement of its intervals 20 with the respective blocks 21, when it is placed upon the frame 9 to drop into working position and is also prevented from dropping into any other. The above mentioned engagement of grooves 18 and bars 19 has also the effect of correctly positioning a magazine 17 in a forward sense. Each magazine in a column, irrespective of whether it is a top one as 15, a bottom one as 17, or an intermediate one as 16, has—Fig. 15—across its top, a series of parallel transverse bars 23; and each magazine above the bottom one, has—Figs. 1, 18, 19 and 20—heels 24 on its bottom face, adapted to engage behind the respective transverse bar 23 to prevent those magazines slipping downward. Some of the bars 23 on each magazine have—Figs. 1 and 6—at each end, a bracket 25 fixed to it and a set screw 26 working laterally therein and bearing against the respective side of a heel 24 depending from the magazine above for the purpose of setting it laterally. All the magazines of a column are held together so as to constitute one entity, movable or stationary, by bolts 27—Figs. 1 and 6—passed through the projecting ends of the transverse bars 19, 23. These bars have—Figs. 14 and 15—forked ends 28 instead of bolt holes, the forked ends registering with each other in columns as shown in Fig. 1, so that the bolts 27 can be detached laterally therefrom after their nuts have been slackened instead of their full lengths having to be drawn through holes after their nuts had been unscrewed off them. Other bars 29—Figs. 1, 6, 7 and 15—extend down the tops of the magazines flush with the transverse bars 23, thereby forming a surface upon which a magazine that is being taken off the machine, can slide, it being understood that the direction of this taking-off is frontward. It is to be noted in the case of a bottom magazine 17, that as it is being slid down over the frame 9, the intervals 20 will not catch against the blocks 21 below and in front of them, because none of the said blocks are in the frontward paths of the said intervals.

"*Quick change*" *mechanism*, (Figs. 1, 3 to 9 and 35 to 37.)—The frame 9 has guiding rods 30 symmetrically arranged thereon, depending therefrom, and working in sockets 31 fast to the machine frame 1. The frame 9 is raised and lowered to effect a "quick change" by the following combination:—An arm 32 presenting a grip within reach of the operator and, preferably, situated on the right hand side of the keyboard 2; a transverse shaft 33 turning in suitable bearings in the machine frame and to which the arm 32 is fast; a locking bolt 34 mounted to slide along the adjacent face of the arm 32 and projecting to the rear from an arm 36 pivoted at 37 to the arm 32, extending to the front thereunder and held away from it by a spring 35; a fixed notched quadrant 38 carried by the machine frame 1 in such a position that when the operator is not pressing the arm 36 to the arm 32, the spring 35 will make the locking bolt 34 engage in any one of its notches 39, 40, 41 or 42; an arm 43—Figs. 1 and 5—fast to the shaft 33 and projecting centrally and rearwardly therefrom; a lever 44 fulcrumed at 45 under the frame 9 and on the machine frame 1; a link 46 connecting the rear end of the lever 44 to the practical center of the frame 9; and a connecting rod 47 from the front end of the lever 44 to the rear end of the arm 43. The three notches 39, 40 and 41, correspond with the respective magazines 15, 16 and 17, there being always as many notches in the quadrant 38 as there are magazines in the column and one additional notch 42. When the locking bolt 34 is engaged in the top notch 41 of the three, the bottom magazine 17 is in register with the magazine entrance 12 and the assembler entrance 6. The additional notch 42 is always situated above the said top notch 41 in order that the engagement of the locking bolt 34 in it shall hold the column of magazines high enough to expose all the escapement lever springs (described farther on) above the top of the assembler entrance 6. The direction in which the lever 32 must be moved coincides with that in which the column must be moved to attain the desired result; that is to say if the lever 32 is lifted the column is lifted and vice versa. This coincidence is not indispensable to the invention, but it is preferable to having the directions opposite to each other for the reason that it is the simpler arrangement and saves the operator the trouble of thinking about the direction in which the said lever must be moved to move the column in a given direction. For the reason just stated, it is preferred that the two directions should coincide.

*Balancing the column of magazines*, (Figs. 1, 8, 9 and 35 to 37.)—This is effected, nearly but not quite, by a spring 48 pulling from a tension-adjusting bracket 49 on the front of the machine, upon the rear end of an arm 50 fast to and extending to the rear from a transverse shaft 51 turning in suitable bearings in the machine frame 1. This shaft 51 has two arms 52, 52, fast to it at a suitable angle with the arm 50, one on each side of the link 46, and having their front ends connected by links 53, 53 to the pivot of the connection between the said link 46 and the magazine frame 9. The three arms 50, 52, 52 are obviously the equivalent of a single lever fulcrumed on the shaft 51. The respective positions of the spring 48 and lever 50, 52, 52, may be modified to the extent of being reversed. It is preferred that when the spring 48 is fully extended, the advantage of the leverage shall be with the column of magazines; and that when the spring is collapsed, the said advantage shall be with the said spring. The latter is not connected directly to the arm 50 but by an intermediate chain 54 coöperating with a cam 55 on the said arm. The practical point of attachment of the spring 48 to the arm 50, will always be that at which the chain 54 joins the cam 55, i. e., it will be constantly changing according to the position of the lever mechanism, so that a perfectly regular movement will be imparted to the column of magazines.

The balancing agent in the means just described is the spring 48. It is well known that no spring is constant, i. e., that its effectiveness changes crescendo or diminuendo according to the degree of extension. The function of the chain 54 and cam 55 is to compensate for this change and so make the effective action of the said spring 48 practically constant. Now a freely falling weight is the mechanical equivalent of a constant spring. Consequently the present invention is to be understood as including the combination with the column of magazines of any balancing means the agent in which is either a spring or an arrangement of springs or a freely falling weight. An arrangement in which a freely falling counterweight 48ª is substituted for the spring 48, is seen in Fig. 37ª. The weight is shown suspended by a chain from the arm 50 and in other respects the construction is the same as that already described. Or the weight might be arranged as shown in dot and dash line with its chain running over a pulley 48ᵇ and connected to a link or rod 53ª which is the equivalent of the link 53.

*Insuring exactness of register after a "quick change,"* (Figs. 1, 3 to 8, 10, 11 and 35 to 37.)—There is always wear at the pivots of the "quick change" mechanism described above, and this wear becomes in time, enough to prevent the magazine that is substituted by the "quick change", registering exactly with the magazine entrance 12 behind it and with the assembler entrance 6 in front of it. Exactness of register is insured by the following means—Figs. 1, 6 to 11, and 35 to 37: 56 is a block fast to the magazine frame 9 near each corner of it, two on one side of the said frame and two on the other. Each block has a slot 57 along its outer side face, the four slots being from front to rear with their top faces parallel with the slope of the column of magazines as well as in the same plane, and their bottom faces inclined downward and rearward. 58, 59, 60, 61 are four equal and upstanding arms, one mounted behind each block 56 on some convenient part of the machine frame 1, to rock in a plane parallel with the front to rear median line of the column of magazines. Each front arm 58, 61, turns on a stud 62 projecting laterally from the machine frame 1, while the two rear arms 59, 60, turn on a transverse shaft 63 carried by the distributer brackets 5—Fig. 10. Each of the four arms, 58 to 61, carries studs 64 which project laterally and inward therefrom toward the respective side of the column, to be behind, and to engage in, the slots 57. There is only one plane of slots 57, but there are as many studs 64 on an arm 58, 59, 60 or 61, as there are magazines in a column. The axes of these arms are in a plane parallel with the slope of the column of magazines—Fig. 1— and the studs 64 are equal in size, those on any one arm equidistant from each other, the whole number being thus distributed in three planes parallel with each other as well as with the one last mentioned, and at the same distance from each other as that which separates the three magazines 15, 16 and 17, from each other, center to center. Each stud 64 has, preferably, an eccentric bedding in the respective arm, instead of being fast therein, in order that the moment at which it contacts with the respective slot 57 after the respective arm has begun to move, may be adjusted exactly, and in addition thereto a device for locking it in its adjusted position. Consequently, there is a tier of studs to insure exactness of register of each magazine when the latter is in register with the magazine entrance 12 and the assembler entrance 6. It is with the top faces of the slots 57 that the respective plane of studs 64 engages, because as the weight of the column of magazines overcomes the spring 48, the motion to insure exactness of register, must be upward. As soon as the operator has made the magazine to be substituted for its predecessor, register with the magazine entrance 12 and the assembler entrance 6 as exactly as the "quick change" mechanism before described, is capable of doing, the four slots 57 register with the respective four studs 64 and the latter are forthwith pulled into the said slots by springs 65 adapted to constantly urge the arms 58 to 61, into the register-insuring position.

The insuring means just described must be disengaged from the blocks 56, *i. e.*, from the magazine frame 9 because the said blocks are fast thereto, before another "quick change" can be effected. This disengagement is effected by the following means: The arm 36 of the locking bolt 34 already described has a rearwardly projecting arm 66, the two constituting, in this respect, a bell crank lever. The arm 66 carries a roller 67 which it holds in contact with an arcual surface 68 on an arm 69 slotted at 70, 71 to move in a frontward or rearward sense over the shaft 33 and a fixed stud 72 to the rear under the pull of a spring 73 pulling on it from a fixed point 74 on the machine frame and to the front under the action of the bell crank lever just mentioned when the arm 36 is pressed upward to the arm 32. The rock of the arm 66 is equal to the unlocking motion of the arm 36. The arm 69 carries a vertical arm 75 which is loosely connected as by a slot and stud device 144, to the adjacent upstanding arm of a bell crank lever 76 rocking freely on its fulcrum which may be and conveniently is the shaft 33. The other and rearwardly projecting arm of this bell crank lever 76 is pivotally connected to the bottom end of a connecting rod 77, the top end of which is similarly connected to the frontwardly projecting arm of a bell crank lever 78 which turns on the right hand stud 62. The other arm—an upstanding one—of the lever 78, carries a lateral stud 79 in front of the arm 58 to rock it backward against the pull of its spring 65, thereby disengaging the particular stud 64 then in engagement with the respective locating block 56, from it. A disengagement is effected whenever the operator presses the arm 36 to the arm 32; because the consequent motion of the roller 67 over the surface 68, pulls the arm 69 to the front, and through the arm 75, lever 76, rod 77, lever 78 and stud 79, rocks the arm 58 to the rear. But all four arms 58, 59, 60 and 61 must be rocked backward together and, for that reason, means are provided by which the other three arms, 59, 60, 61, simultaneously reproduce the backward rock of the arm 58. There does not happen to be room for the axis of the arm 58 and lever 78 to be continued transversely through the machine illustrated. That being the case, the energy of the lever 78 is carried around the machine frame 1, i. e., rearward to the second arm 59, transversely to the third arm 60, and finally frontward to the fourth arm 61. This carrying around is not an essential feature of the invention but only a concession to the lack of room just referred to. It is effected by a third arm 80 on the lever 78; and depending therefrom a link 81 from it to the outer end of an arm 82 fast to and depending from—Figs. 8, 10 and 11—the transverse shaft 63 already mentioned as turning in bearings in the distributer bracket 5; an arm 84 fast on the shaft 63 and holding a stud 85 in front of the second arm 59; an arm 86 likewise fast on the shaft 63 and holding a stud 87 in front of the third arm 60; an arm 88—Figs. 1 and 8—turning on the left hand stud 62 and holding a stud 89 in front of the fourth arm 61; and a link 90 connecting the two arms 86 and 88. The three arms 84, 86, 88 hold their respective studs 85, 87 and 89 in the same angular position as the lever 78 holds its stud 79, so that the engagements of the said studs with the respective arms 58 to 61 are simultaneous.

The above described "quick change" mechanism and the means for insuring exactness of register, act as follows: So long as any magazine is being composed from, the coöperation of the "quick change" mechanism and the register-insuring means hold it in exact register with the magazine entrance 12 and the assembler entrance 6. When the operator has to make a "quick change" he presses the locking arm 36 up to the grip of arm 32, thereby withdrawing the locking bolt 34 from the quadrant 38 and the four studs 64, then in the slots 57, from the latter, thereby freeing the frame 9. The arm 32 is then raised or lowered, the arm 36 being kept up to it, until the locking bolt 34 is opposite that one of the notches below the additional notch 42 in the quadrant 38, which corresponds with the desired substitution of magazine, thereby putting that magazine in register with the magazine entrance 12 and the assembler entrance 6. The locking arm 36 is then released, the locking bolt 34 pushed into the selected notch by its spring 35, and the respective plane of studs 64 pulled into the slots 57 by the four springs 65, the spring 73 at the same time returning the arms 69 and 75, the lever 76, the rod 77 and the lever 78.

The essence of the invention in respect of the means for insuring exactness of register, consists in the combination of one plane of studs with a plane of tapered surfaces for each magazine of the column, and means for engaging the said plane of studs with the selected plane of tapered surfaces with each other and for disengaging them from each other. Consequently, the constructional details of these insuring means may be varied within the limits just indicated. The following are instances of variations within the said limits: The slots 57 are described and shown as being on the magazine frame 9 and the arms 58, 59, 60 and 61, as being on the machine frame 1. But the slots 57 might be on the machine frame 1 and the arms 58 to 61 be on the magazine frame 9. There is described and shown, one plane of slots 57 and several planes of studs 64. There may be one plane of studs 64, say on the arms 58 to 61, and several planes of slots, say, on the column of magazines. Any combination of slots 57 and studs 64 may be replaced by one of tapered sockets and tapered studs, as shown in my co-pending application Serial No. 518,238.

*Matrix escapement mechanism.* (Figs. 1, 2, 7 and 21 to 34.)—The delivery mouth of a magazine consists—Fig. 7—of a flat bar 91 scarf jointed with the front edge of the top plate 92 of a magazine, and a second bar known as the "escapement bar" which is scarf jointed with the bottom plate 93 of a magazine, these two bars being bolted together and to the magazine as by bolts 94. The escapement bar consists of three members—a rear member 95, a middle member 96 and a front member 97—held together by any suitable means, such as keys 98 and screws 99, and is itself fixed to the bottom plate 93. The well-known matrix grooves 100 in the opposite faces of the top and bottom magazine plates 92, 93 are continued—Figs. 21 to 30—through the opposite faces of the bar 91 and the escapement bar.

101 is one of the improved escapement levers. It has a front pawl 102 and a rear pawl 103 engaging with the two respective matrices through holes as heretofore, but these holes are in the escapement bar—Fig. 7—and each pawl is connected to the respective end of the lever 101 by a tooth 104 engaging in a recess in the said end after the manner of a rack and pinion gear. All the escapement levers 101 are threaded upon a rod 105 which is supported by the middle member 96 of the escapement bar in such a way as to serve as a pivot for them all. The top edge of each lever 101 is beveled downward to the front and rear from a line above its axis, to allow of its being rocked. This rocking is effected in one direction by one escapement spring as heretofore and in the other by a pusher. An escapement spring 106—Fig. 7—consists preferably of a long arm, a short arm, and a coil connecting them, the two arms being approximately parallel with each other and on the same side of the coil. Each spring is held to the front member 97 of the escapement bar by having its short arm inserted in a socket in the front face of a recess extending along the front face of the said member and deep enough to receive the coil. When a spring 106 is so fixed, its longer and operative arm extends rearward far enough to be inserted in the respective front pawl 102.

107 is a rod threaded through the coils of all the springs 106 and made fast to the front member 97 of the escapement bar. The normal effect of a spring 106 is as heretofore, viz., to hold the respective front pawl 102 in front of the top lug on the respective leading matrix and its rear pawl 103 ready to engage in front of the corresponding lug on the next matrix as the lever 101 is reversed. The connection between each lever 101 and the coöperating rod 3, consists of a tooth 108 depending from the bottom edge of the lever; a pusher 109 alined with the said lever in front of it, sliding in a suitable guide on the bottom plate 93, in constant touch with the tooth 108, straddling a transverse bar 110 on the said plate 93 which limits its motion in both directions; and held by the respective spring 106 with its head flush with the plane of the magazine delivery mouth; a vertical lever 111 having a striking head 112 on its top and held normally a short distance in front of the pusher 109; and a bell crank lever having one arm 113 in constant touch with the bottom end of the lever 111 behind it and its other arm 114 constantly engaged in the notch 11 on the top of the rod 3. The set of levers 111 with their intermediate antifriction plates (not shown) are threaded upon a rod 115 and the set of bell crank levers with their intermediate antifriction plates (likewise not shown) are threaded on a pivot rod 116. The ends of these rods are carried by two cheeks, one, 117, at each end. Instead of there being a distinct set of antifriction plates for each set of levers, one set of the same contour as the cheeks 117, suffices.

118 is a rod threaded through the cheeks 117 and the antifriction plates, behind the bottom arms of the levers 111, and up to which the springs 10 rock the said arms.

The parts 111 to 118 are held in working position by fastening the cheeks 117 to the end lugs 119 of a transverse bar 120 fast to the back plate of the assembler guide 7. The slots 121—Figs. 32 to 34—in the rear face of this bar receive the front edges of the antifriction plates just mentioned.

122 is a spring in front of each lever 111 and constantly urging its striking head 112 to make the respective pusher 109 push the tooth 108 backward against the action of the spring 106, to reverse the respective escapement lever 101, but the head 112 is kept clear of the pusher 109 and the spring 122 in tension by the respective spring 10. A spring 122 is shown as consisting of a length of spring wire having two arms of unequal length at right angles with each other and joined by a coil, and as being fixed in working position by having its short arm inserted in a socket 123 in the front face of the bar 120.

124 is a rod threaded through the coils of the set of springs 122 and the lugs of the bar 120.

An escapement rod 3 is raised against the pull of its spring 10 by its corresponding key lever on the keyboard 2 as heretofore. As soon as a rod 3 is so raised, the corresponding levers 111 and 113, 114, are freed from the control of the respective spring 10 and the spring 122 drives the striking head 112 rearward, thereby making it reverse the escapement lever 101 and release the leading matrix. There is an opening in the above mentioned back plate of the assembler guide 7 in front of the set of springs 122, of sufficient area to give easy access to them all and to the immediately adjacent parts. It is closed by a cover 125 which is removable by being slid in a lateral direction on the back plate of the assembler guide 7.

*Modifications of the matrix escapement mechanism*, (Figs. 38 to 43).—The connection between each pawl 102, 103, and the respective end of their escapement lever 101 illustrated in Fig. 7, may be replaced by a ball or disk 126 projecting from the respective edge—Fig. 38—or from the respective corner—Fig. 43—of the pawl, and engaging in a coöperating cavity in the respective end of the said lever 101. According to the construction illustrated in Fig. 7, a front pawl 102 is pulled down out of engagement with a leading matrix 127 and a rear pawl 103 pushed up to be ready to engage with a following matrix 128, as a consequence of the rise of the respective escapement rod 3. The latter is raised by positive means and the two pawls 102, 103, must move together because they are both connected to their lever 101. But if the matrices are sticky—and they sometimes are so—they will not slide down the grooves 100 as quickly as they ought to do, the consequence being that a front bottom lug 129 of a following matrix 128 will be caught by a rear pawl 103, instead of the latter engaging in the space 130 between the said front bottom lug 129 and the rear bottom lug 131 on the same matrix. This would check the rise of the rod 3 as well as the action of the pusher 109 and intermediate parts, with the result that some part of the escapement mechanism, say the positive means that raises the rod 3, would be damaged. To prevent such damage, there is introduced at some convenient point between each rod 3 and the respective pusher 109, an automatic yielding pressure device which will allow the said rod 3 to rise as high as it is required to do, in spite of the fact that the said pusher 109 is checked in the way explained above. One form of such device is illustrated in Figs. 38 and 39 and a substitute one in Fig. 40. Referring to Figs. 38 and 39, a lever 111 is replaced by one 145 rabbeted from the line 146 upward, to receive the lower portion of an arm 147 rabbeted from the line 148 downward, so that when both are threaded on the rod 115, their joint thickness is not more than that of a lever 111. The arm 147 carries the striking head 112. 149 is a spring resilient between the lever 145 and the arm 147 and forcing their top ends apart. The spring 149 is strong enough to transmit the energy of the rod 3 to the pusher 109 so long as the latter is not checked and weak enough to yield before that energy when the said pusher is checked. The line 146 and the bottom end of the arm 147, are shown as straight, but they may obviously be curved, provided that they are concentric with the pivot rod 115. Referring to Fig. 40, a lever 111ª has its lower arm 132 endowed, as by being of tempered spring steel, with the strength and weakness described in connection with the spring 149.

Each of the Figs. 38 to 43 show a striking head 112 as made to actuate the respective pusher 109, by the rise of a rod 3, so that the connection between the said rod and the lever 111 or its substitute 145 is a positive one. Fig. 38 shows it as consisting of a rack 154 on the rod 3; a gear 155 on the bottom end of the lever 145; and a gear 156 turning on the pivot rod 116 engaging with both rack 154 and gear 155. Figs. 39 and 40 show it as consisting of a notch 157 in the top of the rod 3; a bell crank lever turning on the pivot rod 116 having one arm 158 engaging with a working fit in the notch 157 and the other 159 forked to embrace with a working fit, the rounded bottom end 160 of the lever 145 or 111. Fig. 41 shows a striking head 112 carried by the upper arm of a bell crank lever 161 pivoted on the pivot rod 116, the lower arm of which is cranked to the front to rest upon the top of the respective rod 3 which is cranked accordingly. 162 is a spring pulling on the front of each upper arm from a fixed point in the transverse bar 120 to return the striking head 112 and lever 161. Fig. 42 shows that the rise of a rod 3 rocks a lever 111ᵇ through a bell crank lever 163 turning on the pivot rod 116 and having its top arm engaging with the rear of the bottom arm of the said lever 111ᵇ, the latter being returned by a spring 162 as in Fig. 41. In Fig. 43, a pivoted lever 161 is returned by the drop of the respective rod 3 and is limited in its return by a stop rod 164, the top of the said rod being notched to embrace the frontwardly projecting end of the said lever. Figs. 38 to 43 indicate further that an escapement rod drops by its own weight as distinguished by being returned by a spring 10.

The bottom plate 93 of a magazine is too thin to provide room for the pivot rod 105 of a set of escapement levers 101. It must therefore be in a separate piece and that piece must be a depending piece with reference to the magazine. But the farther the pivot rod 105 is below the top of the plate 93, the longer will be the versed sine of the arc made by each escapement pawl and, consequently, the wider must be the pawl holes in the said plate. When the escapement levers F of the prior Patent 635998 have been practically pivoted on the pivot rod $b^5$—see Fig. 2 of that patent—the pawl holes are wide enough for the lugs of the matrices to drop into and that is fatal to the working of the machine. According to the construction illustrated in the drawings accompanying the present specification and described therewith, the pawl holes in the plate 93 are only just large enough to pass the pawls. Again, the spring $F^5$ that worked the escapement F is a helical one possessing a certain minimum resilience which means a certain minimum diameter and that means further increasing the distance between two adjacent magazines; that is, further after they have been distanced enough to receive the depending piece above mentioned and such further increase is practically inadmissible. The present construction substitutes for the helical springs of the said prior patent, springs whose resilience is independent of their diameters and which lie within the space between the top of plate 93 and the bottom of the escapement levers 101, and pushers 109 that are certain to act because they butt against surfaces—the teeth 108—at right angles to their own motion, and the rock of the teeth 108 will be through an increasing arc for each unit of the rearward motion of a pusher 109; whereas the piston on the rod $F^4$ of the said prior patent must move some distance before it can appreciably rock the escapement F.

With reference to the combination of the striking levers 111 and the escapement rods 3, the present invention does not change the position of the latter—it only shortens them to make room for the descent of the column of magazines to the lowest position. The combination of cheeks 117 and the antifriction plates occupies space that has always been vacant in this type of machine.

In the prior Patent 787817, an average slide O—see Fig. 3 of that patent—is thicker than the distance between two adjacent columns of matrices, thereby necessitating an increase in the width of the magazine without any increase in its working capacity. The present invention puts nothing in the said distance, because the thickest lever 111 is not so thick as the thinnest matrix in the font even including the clearance necessary to its delivery from the delivery mouth of its magazine.

*Coöperation of the column of magazines with the magazine entrance,* (Fig. 1.)—The presence of an escapement bar upon the lower side of each magazine necessitates a space 150 between each two adjacent magazines and as the latter are parallel with each other, the entrance mouths 13 of the said two magazines, are separated by the same space. The magazine entrance 12 is, as heretofore, functionally a curved and channeled plate connecting the distributer 4 with the magazine and is pivoted with reference to the latter in order that it can be rocked to the rear to expose its concave face in the event of matrices becoming jammed in it, in order that such jam may be relieved. So long as there was only one magazine on the machine and that a stationary one, it was a matter of indifference as to which part of the machine, the said magazine entrance was pivoted. But the present invention contemplates the presence on the machine, of a column of magazines movable up or down, and of only one distributer and one magazine entrance. Consequently the latter must be pivoted so that it is independent of the movement of the magazines while it retains its capacity of registering with the distributer 4. It is therefore pivoted by its two end plates 137 to the respective sides of the distributer bracket 5. Each side of the latter carries a shoulder 138 upon which the entrance 12 can rest when it is rocked back in the event of a jam, and end plate 137 carries a lug 139 to engage with the respective shoulder 138 for that purpose.

140 is a spring pulling from the distributer bracket 5 upon an arm 141 fast to the respective end plate 137, to hold the magazine entrance 12 in correct working contact with the entrance mouth 13 of the respective magazine.

142 is a set screw adjustable in a lug 143 at each end of the magazine entrance 12 to and from the rear face of the column of magazines in order that the correct working contact just mentioned may be secured and maintained.

The act of rocking the magazine entrance 12 back under the circumstance and for the purpose mentioned, may and frequently does, loosen the jammed matrices, and in that event, all that remains, to be done is to rock the magazine entrance up to the respective magazine mouth 13 again. But with the said column of magazines, the so loosened matrices would tend to slide into either the nearest space 150 or the nearest magazine entrance mouth 13. To prevent such slidings when the top magazine 15 of the column is in register, there is a plate 151 fixed to the machine independently of both the column of magazines and the magazine entrance 12, extending the full length of the mouths 13, parallel with the plane of them, and so positioned that it covers the top space 150 and the mouths 13 of all the magazines below the top one when the latter is in register, and leads into the usual trough 14. The matrices loosened from a jam in the magazine entrance 12 by the latter being rocked back, when the top magazine is in register, might slide on to the top plate 92 of the latter, but they would not do any harm there and might be picked up and disposed of forthwith. But if a lower magazine were in register, the space 150 immediately above it would be exposed to loosen matrices sliding—perhaps jumping—down the rocked-back magazine entrance 12. Each space 150 is therefore closed by a closer consisting of a pair of angle bars 152, 153, one fixed to the bottom plate 93 of each upper magazine and the other fixed to the top plate 92 of the next magazine below it, both bars having their upright flanges flush with the magazine entrance mouths 13 and too close to each other for the thinnest matrix to get between them. The closer aforesaid might consist of a single bar of channel section instead of two angle bars 152 and 153. But it is desirable that both the top and bottom plates, 92 and 93, of a magazine should be stiffened along the respective entrance mouth 13. The closer consisting of a channel section bar would do this but it would either be made fast to both of the magazines contacting with it, which may be undesirable, or it would be made fast to only one of such magazines, say the upper, in which case if that magazine were slid down over the magazine below, the bar would foul the brackets 25 on the latter magazine.

We claim,

1. In a typographical composing machine of the described type, the combination of magazine frame, grooved transversely; a magazine having transverse bars on its underside to engage in the grooves in the said frame; movable blocks in the said grooves and corresponding intervals in the said transverse bars to straddle and position the blocks; and means for fixing the said blocks to the magazine frame.

2. In a typographical composing machine of the described type, the combination of upper magazines having transverse bars on their top, and heels on their bottom faces to engage behind the respective transverse bars on the magazines respectively beneath them; side brackets on each of the magazines of the column and set screws working in said brackets, the set screws of each magazine being operative against the magazine next above to adjust the last named magazine laterally; forks adapted by being held by one of the said transverse bars projecting laterally beyond the respective magazine, to register with the forks above and below it; and holding bolts in each column of forks, detachable laterally therefrom.

3. In a typographical composing machine of the described type, the combination of upper magazines having transverse bars on their top, and heels on their bottom faces to engage behind the respective transverse bars on the magazine respectively beneath them; side brackets on each of the magazines of the column and set screws working in said brackets, the set screws of each magazine being operative when adjusted against the magazine next above to adjust the last named magazine laterally; forks adapted by being held by the said transverse bars projecting laterally beyond the respective magazine, to register with the forks above and below it; and holding bolts in each column of forks, detachable laterally therefrom.

4. In a typographical composing machine of the described type, the combination of a magazine frame grooved transversely; a bottom magazine having transverse bars to engage in the grooves in the said frame; blocks in the said grooves and corresponding intervals in the said bars to straddle and position the blocks; means for fixing the said blocks to the magazine frame; upper magazines having transverse bars on their top, and heels on their bottom faces to engage behind the respective bars on the magazines respectively beneath them; brackets on their sides and on those of the bottom magazine of the column and set screws working therein and bearing against the magazine above it to adjust it laterally; forks adapted by being held by one of the said transverse bars projecting laterally beyond the respective magazine, to register with the forks above and below it; and holding bolts in each column of forks, detachable therefrom laterally.

5. In a typographical composing machine of the described type, the combination of upper magazines having transverse bars on their top, and heels on their bottom faces to engage behind the respective transverse bars on the magazines respectively beneath them; brackets on their sides and on those of the bottom magazine of the column and set screws working therein and bearing against the magazine above it to adjust it laterally; forks projecting laterally beyond the respective magazines and registering with the forks above and below it; and holding bolts in each column of forks, detachable therefrom laterally.

6. In a typographical composing machine of the described type, a magazine, transverse bars secured to the upper surface of said magazine, and a plurality of parallel track bars fixed to said upper surface with their upper faces flush with the upper faces of said transverse bars, said track bars extending from top to bottom of said magazine for the purpose set forth.

7. In a typographical composing machine of the described type, the combination of upper magazines having transverse bars on their top, and heels on their bottom faces to engage behind the respective transverse bars on the magazines respectively beneath them; brackets on their sides and on those of the bottom magazine of the column and set screws working therein and bearing against the magazine above it to adjust it laterally; forks projecting laterally beyond the respective magazines and registering with the forks above and below it; holding bolts in each column of forks, detachable therefrom and bars extending down the top of each magazine in the column.

8. In a typographical composing machine of the type comprising a series of superposed magazines, the combination of a freely rising and falling frame adapted to support the series of magazines, guides cooperative with said frame in the rising and falling movements thereof, means adapted to produce flotation of said frame and said magazines, and lever control mechanism accessible from the keyboard for controlling the height at which said series floats.

9. In a typographical composing machine of the type comprising a series of superposed magazines, the combination of a freely rising and falling frame adapted to support the series of magazines, guides cooperative with said frame in the rising and falling movements thereof, means adapted to produce flotation of said frame and said magazines, and lever control mechanism adapted to be depressed to lower said series and to be raised to permit said frame and said magazines to float at a higher level.

10. In a typographical composing machine of the type comprising a series of superposed magazines, the combination of a freely rising and falling frame adapted to support the series of magazines, guides cooperative with said frame in the rising and falling movements thereof, means adapted to produce flotation of said frame and said magazines, lever control mechanism accessible from the keyboard for controlling the height at which said series floats, and locking means operative between said lever and the fixed frame in positions corresponding with the correct working positions of respective magazines.

11. In a typographical composing machine of the type comprising a series of superposed magazines, the combination of a freely rising and falling frame adapted to support the series of magazines, guides cooperative with said frame in the rising and falling movements thereof, a floating support for said frame comprising means adapted to store and refund energy, lever control mechanism accessible from the keyboard for controlling the heights at which said frame floats, and locking means operative between said lever and the fixed frame in positions corresponding with the correct working positions of respective magazines.

12. In a typographical composing machine of the type comprising a series of superposed magazines, the combination of a freely rising and falling frame adapted to support the series of magazines, guides cooperative with said frame in the rising and falling movements thereof, a floating support for said frame comprising a freely falling counterweight, lever control mechanism accessible from the keyboard for controlling the height at which said frame floats, and locking means operative between said lever and the fixed frame in positions corresponding with the correct working positions of respective magazines.

13. In a typographical composing machine of the described type, a movable column of magazines, a counterbalance operative to oppose the dead-weight of said column, a "quick change" mechanism for said column consisting of a shaft; an arm fast thereon and projecting therefrom near the keyboard; a rearwardly projecting arm fast to the said shaft; a link depending from the tier of magazines; a lever fulcrumed independently of the said tier and having its rear end pivotally connected to the bottom end of the said link; and a connecting rod from the front end of the said lever to the said rearwardly projecting arm.

14. In a typographical composing machine of the described type, the combination of a movable column of magazines, means for balancing the column of magazines consisting of a lever fulcrumed on the machine; a connection from one arm of it to the said column; and a counter balance connected by one end to the machine and by the opposite end to the other arm of the said lever.

15. In a typographical composing machine of the described type, the combination with a movable column of magazines and the "quick change" mechanism thereof, of means for balancing the column of magazines consisting of a lever fulcrumed on the machine; a connection from one arm of it to the said column; and a counterbalance connected by one end to the machine and by the opposite end to the other arm of the said lever.

16. In a typographical composing machine of the described type, the combination with a movable column of magazines and the "quick change" mechanism thereof, of means for balancing the column of magazines consisting of a lever fulcrumed on the machine frame; a connection from one arm of it to the said column; and a counterbalance connected by one end to the machine frame and by the opposite end to the other arm of the said lever, the connection between counterbalance and arm being a chain and a cam on the arm on which cam the chain bears.

17. In a typographical composing machine of the described type, the combination with a movable column of magazines of a "quick change" mechanism consisting of a shaft; an arm fast thereon and projecting therefrom near the keyboard; a rearwardly projecting arm fast to the said shaft; a link depending from the column of magazines; a lever fulcrumed independently of the said column and having its rear end pivotally connected to the bottom end of the said link; a connecting rod from the front end of the said lever to the said rearwardly projecting arm, and means for balancing the column of magazines consisting of a lever fulcrumed on the machine frame; a connection from one arm of it to the said column; a counterbalance connected by one end to the machine frame and by the opposite end to the other arm of the said lever.

18. In a typographical composing machine of the described type, the combination with the column of magazines, of means for insuring exactness of register after a "quick change", consisting of the combination of one plane of studs with a plane of tapered surfaces for each magazine of the column, and means for engaging the said plane of studs and the selected plane of tapered surfaces with each other and for disengaging them from each other.

19. In a typographical composing machine of the described type, the combination with a movable column of magazines and a counterbalance therefor, of means for insuring exactness of register after a "quick change", consisting of the combination of slots symmetrically arranged in one plane on the column of magazines; arms symmetrically arranged about the said column and pivoted independently thereof; planes of studs carried by the arms; automatic means for putting a plane of studs into the said slots; and manual means for disengaging the studs of that plane from the slots.

20. In a typographical composing machine of the described type, the combination with a movable column of magazines and a counterbalance therefor of a "quick change" mechanism consisting of a shaft; an arm fast thereon and projecting therefrom near the keyboard; a rearwardly projecting arm fast to the said shaft; a link depending from the column of magazines; a lever fulcrumed independently of the said column and having its rear end pivotally connected to the bottom end of the said link; a connecting rod from the front end of the said lever to the said rearwardly projecting arm and means for insuring exactness of register consisting of the combination of slots symmetrically arranged in one plane on the column of magazines; arms symmetrically arranged about the said column and pivoted independently thereof; planes of studs carried by the arms; automatic means for putting a plane of studs into the said slots; and manual means for disengaging the studs of that plane from the slots.

21. In a typographical composing machine of the type comprising a series of superposed magzaines, a freely rising and falling frame adapted to support the series of magazines, guides coöperative with said frame in the rising and falling movements thereof, a floating support for said frame and series comprising a counterbalance, lever control mechanism for controlling the height at which said series floats, and automatic registration means adapted to secure correct register of respective magazines after each operation of said lever control mechanism.

22. In a typographical composing machine of the described type, the combination with a movable column of magazines and a counterbalance therefor of a "quick change" mechanism consisting of a shaft; an arm fast thereon and projecting therefrom near the keyboard; a rearwardly projecting arm fast to the said shaft; a link depending from the column of magazines; a lever fulcrumed independently of the said column and having its rear end pivotally connected to the bottom end of the said link and a connecting rod from the front end of the said lever to the said rearwardly projecting arm with means for insuring exactness of register after a "quick change."

23. In a typographical composing machine, the combination with a magazine consisting of a top and bottom plate, of an escapement bar composed of a plurality of elements, tongue and groove joints between the elements, and a scarf joint between the bar as a whole and the front edge of one of said plates.

24. In a typographical composing machine, the combination of a magazine consisting of a top plate and a bottom plate, an escapement bar composed of a plurality of elements, tongue and groove joints between the elements, a scarf joint between the bar as a whole and the front edge of said bottom plate, and means adapted to secure said bar to said magazine.

25. In a typographical composing machine, the combination with a magazine consisting of a top and a bottom plate, of a flat bar scarf jointed with the front edge of the top plate, an escapement bar composed of a plurality of elements, tongue and groove joints between the elements, a scarf joint between the bar as a whole and the front edge of said bottom plate, and means adapted to secure said escapement bar to said magazine.

26. In a typographical composing machine, the combination with a magazine consisting of a pair of parallel plates, a flat bar scarf jointed to the front edge of one of said plates, an escapement bar composed of an assemblage of tongued and grooved elements scarf jointed to the front edge of the other of said plates, and means adapted to secure said bars together and to said magazine.

27. In a typographical composing machine, the combination of an escapement bar; a set of escapement levers pivoted therein; a set of front pawls connected to the said levers and a spring controlling each lever consisting of parallel long and short arms joined by an intermediate coil and presenting their free ends toward one end of the lever, the short arm being inserted in a socket in the front of the escapement bar and the long arm being operative to rock the escapement lever.

28. In a typographical composing machine, the combination of an escapement bar; a keyboard; a set of escapement rods; a set of escapement levers pivoted upon said bar; a set of front and rear pawls connected to the said levers; a set of escapement lever springs each spring comprising an arm constantly urged upward by the effort of the spring and operative to maintain said front pawls in matrix engaging position; a set of pushers to actuate the escapement levers against the action of their springs; a set of striker levers to actuate the pushers, and means by which the depression of a key lever actuates the respective striker lever and the release of it is followed by the return of the said striker.

29. In a typographical composing machine, the combination of an escapement mechanism consisting of an escapement lever having a front and rear pawl connected thereto; an escapement lever spring comprising an arm constantly urged upward by the effort of the spring and operative to maintain said front pawl in matrix engaging position; a pusher to actuate the escapement lever against the action of the said spring; a striker lever to make the pusher so actuate the said lever; and a connection between the said striker lever and the respective key lever on the keyboard by which the depression of the said key lever actuates the said striker lever and the return motion of the former is followed by the return motion of the latter.

30. In a typographical composing machine, an escapement mechanism consisting of an escapement lever having a front and rear pawl connected thereto; an escapement lever spring normally holding the escapement lever in one position; a pusher to actuate the escapement lever against the action of the said spring; a striker lever to make the pusher so actuate the said lever; a connection between the said striker lever and the respective key lever on the keyboard, by which the depression of the said key lever actuates the said striker lever and the return motion of the former is followed by the return motion of the latter; and an automatic yielding pressure device between the said key lever and striker lever to allow of the complete depression of the said key lever in spite of the pusher above mentioned not moving before the operative motion of the said striker lever.

31. In a typographical composing machine, an escapement mechanism consisting of an escapement lever having a front and rear pawl connected thereto; an escapement lever spring normally holding the escapement lever in one position; a pusher to actuate the escapement lever against the action of the said spring; a striker lever to make the pusher so actuate the said lever; a key lever; an escapement rod raised by the depression of the said key lever and lowered on its release; a bell crank lever having one arm operatively connected with the escapement rod, and the other arm with one arm of the striker lever, the last mentioned arm being resilient and strong enough to transmit the energy of the rising escapement rod to the pusher so long as the latter is not checked and weak enough to yield before that energy when the pusher is checked.

32. In a typographical composing machine of the described type, the combination with a movable column of magazines having spaces intermediate neighboring members of the column of magazine entrance mouths in the same plane; a plate supported independently of the column of magazines and so positioned that when the top magazine of the column is in register, the said plate covers all the entrance mouths below the top one and all the said spaces; and a space closer consisting of a bar fast to each of the two respective magazines and flush with its entrance mouth.

33. In a typographic machine, the combination of a main frame, a column of magazines mounted in the main frame with freedom to rise and fall therein in an inclined direction, a keyboard and connections for releasing matrices from any selected magazine, a hand lever adjacent to the keyboard, connections between the hand lever and the column of magazines for raising and lowering the latter, and means for counter-balancing the weight of the magazines, the said means operating in the direction of movement of the magazines.

34. In a typographic machine the combination of a main frame, superposed magazines mounted to rise and fall therein, register insuring means to hold the magazines at different heights, a lever, and means connecting with the lever for raising and lowering the magazines and for actuating the registering insuring names.

35. A fixed distributer and a fixed assembler entrance in combination with intermediate rising and falling magazines, a hand lever and connections to raise and lower the magazines at will, means to counterbalance the magazines, a series of register insuring devices to hold the magazines at one height or another as demanded, and a common means for actuating said registering insuring devices.

36. In a typographic machine a column of magazines mounted to rise and fall, register insuring devices for holding them at different heights, means for raising and lowering them at will, and connections between the last named means and said devices to insure the action of the said devices when the respective magazines are at the operative level.

37. In combination with the column of rising and falling magazines, a series of devices to hold the magazines at different heights, and connections to cause the action of said devices in unison.

38. In combination magazines mounted to rise and fall, a hand lever and connections to raise and lower the magazines, devices to hold the magazines at different heights, and means for locking the hand lever and for controlling the said devices.

39. In a linotype machine, the combination with the assembling and distributing mechanisms, of a plurality of magazines arranged between said mechanisms and movable up and down relatively to both of said mechanisms, means to substantially counterbalance the magazines throughout the range of their up and down movement, and means to shift the magazines to bring any selected magazine into register with the assembling and distributing mechanisms.

40. In a linotype machine, the combination with the assembling and distributing mechanisms, of a plurality of magazines arranged between said mechanisms and movable up and down relatively to both of said mechanisms, means to substantially counterbalance the magazines throughout the range of their up and down movement, a key board, and means adjacent the key board for shifting the magazines to bring any selected magazine into register with the assembling and distributing mechanisms.

In witness whereof we have hereunto set our hands in the presence of two witnesses.

HERBERT PEARCE.
JOHN ERNEST BILLINGTON.

Witnesses:
J. ARNOLD HANCOCK,
THOMAS A. ANDREWS.